(12) United States Patent
Khouri et al.

(10) Patent No.: US 8,954,863 B2
(45) Date of Patent: Feb. 10, 2015

(54) INTELLIGENT SOCIAL COLLABORATION UNIFIED MEDIA

(75) Inventors: Joseph F. Khouri, San Jose, CA (US); Raghurama Bhat, Cupertino, CA (US); Ashish S. Chirputkar, Fremont, CA (US); Muralidhar K. Sitaram, Los Altos, CA (US); James P. Beno, Oakland, CA (US); David H. Law, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 12/946,390

(22) Filed: Nov. 15, 2010

(65) Prior Publication Data

US 2012/0210247 A1    Aug. 16, 2012

(51) Int. Cl.
*G06F 3/048*     (2013.01)
*G06Q 10/10*     (2012.01)
*G06F 3/0481*    (2013.01)
*G06F 3/0482*    (2013.01)

(52) U.S. Cl.
CPC .......... *G06Q 10/101* (2013.01); *G06F 3/04812* (2013.01); *G06F 3/0482* (2013.01)
USPC .......................................... 715/751; 715/712

(58) Field of Classification Search
USPC .......... 709/203, 205; 715/751–759, 963, 712, 715/748–749, 805, 804, 780
See application file for complete search history.

(56) References Cited

U.S. PATENT DOCUMENTS

| | | | |
|---|---|---|---|
| 7,257,403 B2 * | 8/2007 | Nikkelen | 455/436 |
| 7,305,679 B2 * | 12/2007 | Kovacs et al. | 719/313 |
| 7,403,616 B2 * | 7/2008 | Kageyama et al. | 380/201 |
| 7,966,647 B1 * | 6/2011 | Igoe et al. | 726/2 |
| 8,589,338 B2 * | 11/2013 | Maes | 707/608 |
| 2002/0010679 A1 | 1/2002 | Felsher | |
| 2005/0262470 A1 | 11/2005 | Gavrilov | |
| 2007/0203991 A1 | 8/2007 | Fisher | |
| 2007/0226205 A1 | 9/2007 | Carrer et al. | |
| 2008/0104679 A1 | 5/2008 | Craig | |

(Continued)

FOREIGN PATENT DOCUMENTS

| | | |
|---|---|---|
| WO | 2005/065174 | 7/2005 |
| WO | 2007/106185 | 9/2007 |
| WO | 2010/124302 | 10/2010 |

OTHER PUBLICATIONS

U.S. Appl. No. 12/946,481, filed Nov. 15, 2010.

(Continued)

*Primary Examiner* — Steven Sax
(74) *Attorney, Agent, or Firm* — Baker Botts L.L.P.

(57) ABSTRACT

In one embodiment, a method includes receiving information from a user in a collaboration network, the information including a unit of content, a title, an indication of one or more entities in the collaboration network allowed to access the unit of content, and for each of the entities in the collaboration network allowed to access the unit of content, an indication of a permission level with respect to the access. The permission level includes view, comment, edit, or share. The method further includes determining a format for presentation of the unit of content based at least in part on the permission levels indicated for the one or more entities in the collaboration network allowed to access the unit of content, and publishing the unit of content and the title for the unit of content to the collaboration network in the determined format and according to the information.

13 Claims, 15 Drawing Sheets

(56) References Cited

U.S. PATENT DOCUMENTS

| | | | |
|---|---|---|---|
| 2008/0244020 A1* | 10/2008 | Dolan | 709/206 |
| 2008/0250332 A1 | 10/2008 | Farrell et al. | |
| 2008/0270353 A1 | 10/2008 | Morinville | |
| 2008/0282338 A1 | 11/2008 | Beer | |
| 2009/0055415 A1* | 2/2009 | Golds et al. | 707/100 |
| 2009/0171910 A1* | 7/2009 | Sarkeshik | 707/3 |
| 2009/0182822 A1 | 7/2009 | O'Sullivan et al. | |
| 2009/0222759 A1 | 9/2009 | Drieschner | |
| 2009/0234902 A1 | 9/2009 | Pilosof | |
| 2009/0235182 A1 | 9/2009 | Kagawa | |
| 2009/0248537 A1* | 10/2009 | Sarkeshik | 705/26 |
| 2009/0254843 A1 | 10/2009 | Van Wie et al. | |
| 2009/0288150 A1* | 11/2009 | Toomim et al. | 726/5 |
| 2009/0300002 A1 | 12/2009 | Thomas et al. | |
| 2009/0313265 A1* | 12/2009 | Sifry | 707/10 |
| 2009/0327232 A1* | 12/2009 | Carter et al. | 707/3 |
| 2010/0030808 A1* | 2/2010 | Ress et al. | 707/104.1 |
| 2010/0146054 A1 | 6/2010 | Armstrong et al. | |
| 2010/0269049 A1* | 10/2010 | Fearon | 715/744 |
| 2010/0299717 A1 | 11/2010 | Nasirifard et al. | |
| 2010/0306249 A1 | 12/2010 | Hill et al. | |
| 2010/0318642 A1* | 12/2010 | Dozier | 709/223 |
| 2011/0004831 A1 | 1/2011 | Steinberg et al. | |
| 2011/0004922 A1 | 1/2011 | Bono et al. | |
| 2011/0009107 A1 | 1/2011 | Guba et al. | |
| 2011/0010085 A1 | 1/2011 | Luo et al. | |
| 2011/0078188 A1 | 3/2011 | Li et al. | |
| 2011/0179378 A1 | 7/2011 | Wheeler et al. | |
| 2011/0202430 A1 | 8/2011 | Narayanan et al. | |
| 2011/0208814 A1 | 8/2011 | Bostrom et al. | |
| 2011/0225493 A1* | 9/2011 | Uchida et al. | 715/704 |
| 2011/0225504 A1* | 9/2011 | Uchida et al. | 715/741 |
| 2011/0231930 A1* | 9/2011 | Howarth | 726/21 |
| 2011/0289142 A1* | 11/2011 | Whalin et al. | 709/203 |
| 2011/0289575 A1 | 11/2011 | Shi | |
| 2011/0314392 A1* | 12/2011 | Howarth | 715/753 |
| 2012/0009903 A1 | 1/2012 | Schultz et al. | |
| 2012/0030289 A1* | 2/2012 | Buford et al. | 709/205 |
| 2012/0066340 A1 | 3/2012 | Armstrong et al. | |
| 2012/0072855 A1 | 3/2012 | Baldwin et al. | |
| 2012/0110085 A1 | 5/2012 | Malik et al. | |
| 2012/0191644 A1* | 7/2012 | Carter et al. | 707/608 |
| 2013/0124401 A1* | 5/2013 | Del Real | 705/39 |

OTHER PUBLICATIONS

U.S. Appl. No. 12/946,568, filed Nov. 15, 2010.
U.S. Appl. No. 12/946,700, filed Nov. 15, 2010.
U.S. Appl. No. 12/946,769, filed Nov. 15, 2010.
U.S. Appl. No. 12/946,791, filed Nov. 15, 2010.
European Search report for EP 11158354.8, Apr. 12, 2012.
Stephen Hardison et al., IBM Lotus Connections 2:5: Planning and Implementing Social Software for Your Enterprise, Dec. 24, 2009, IBM Press, Print ISBN-10: 0-13-700053-7, Web ISBN-10: 0-13-704177-2, pp. 1-6, 20-55, 177-214.
K. Griffin et al., U.S. Appl. No. 12/946,481, Non-final Office Action from US PTO, Dec. 13, 2012.
K. Griffin et al., U.S. Appl. No. 12/946,481, Response to Non-final Office Action from US PTO, Feb. 25, 2013.
M. K. Sitaram et al., U.S. Appl. No. 12/946,568, Non-final Office Action from US PTO, Aug. 17, 2012.
M. K. Sitaram et al., U.S. Appl. No. 12/946,568, Response to Non-final Office Action from US PTO, Nov. 13, 2012.
M. K. Sitaram et al., U.S. Appl. No. 12/946,568, Final Office Action from US PTO, Dec. 6, 2012.
M. K. Sitaram et al., U.S. Appl. No. 12/946,568, Request for Continued Examination and Amendment, Jan. 29, 2013.
J. F. Khouri et al., U.S. Appl. No. 12/946,700, Non-final Office Action from US PTO, Dec. 17, 2012.
J. F. Khouri et al., U.S. Appl. No. 12/946,700, Response to Non-final Office Action from US PTO, Mar. 18, 2013.
J. F. Khouri et al., U.S. Appl. No. 12/946,769, Non-final Office Action from US PTO, Nov. 9, 2012.
J. F. Khouri et al., U.S. Appl. No. 12/946,769, Response to Non-final Office Action from US PTO, Feb. 7, 2013.
J. F. Khouri et al., U.S. Appl. No. 12/946,791, Non-final Office Action from US PTO, Dec. 20, 2012.
J. F. Khouri et al., U.S. Appl. No. 12/946,791, Response to Non-final Office Action from US PTO, Mar. 20, 2013.
K. Griffin et al., U.S. Appl. No. 12/946,481, Final Office Action from US PTO, May 29, 2013.
J. F. Khouri et al., U.S. Appl. No. 12/946,700, Final Office Action from US PTO, Jun. 5, 2013.
J. F. Khouri et al., U.S. Appl. No. 12/946,769, Final Office Action from US PTO, Apr. 26, 2013.
J. F. Khouri et al., U.S. Appl. No. 12/946,791, Final Office Action from US PTO, Apr. 26, 2013.
J. F. Khouri et al., U.S. Appl. No. 12/946,481, Request for Continued Examination, Nov. 21, 2013.
J. F. Khouri et al., U.S. Appl. No. 12/946,769, Request for Continued Examination, Jul. 26, 2013.
J. F. Khouri et al., U.S. Appl. No. 12/946,791, Response to Final Office Action, Jun. 26, 2013.
J. F. Khouri et al., U.S. Appl. No. 12/946,791, Request for Continued Examination, Jul. 25, 2013.
K. Griffin et al., U.S. Appl. No. 12/946,481, Non-Final Office Action from USPTO, Jan. 28, 2014.
J.F. Khouri et al., U.S. Appl. No. 12/946,791, Non-Final Office Action from USPTO, Feb. 14, 2014.

* cited by examiner

INTELLIGENT SOCIAL COLLABORATION UNIFIED MEDIA

TECHNICAL FIELD

This disclosure relates generally to social collaboration.

BACKGROUND

An organization, such as an enterprise, may have many employees or other personnel at many locations. To effectively carry out their responsibilities, personnel within the organization may need to communicate and collaborate with each other efficiently in a variety of ways using a variety of media. However, such communication and collaboration may be cumbersome or otherwise difficult, regardless of the where the personnel are located.

DESCRIPTION OF EXAMPLE EMBODIMENTS

Personnel of organizations such as enterprises, businesses, corporations, firms, and other organizations typically need to communicate and collaborate with other personnel in the course of routine business operations. For example, a group of employees at an enterprise may be assigned to work on a particular project. In the course of working on the assigned project, the employees may wish to share documents or inquire about the status of another team member's progress on a particular task. To accomplish these and other tasks related to the project, the team members may utilize various tools such as blogs, wikis, emails, instant messaging, and the like. However, existing tools utilized for communicating and collaborating in an enterprise environment are disjunct, cumbersome, and are generally difficult to use for enterprise-related activities. In addition, existing tools utilized for communicating and collaborating in an enterprise environment may overwhelm users with information crowding and clutter. As a result, the productivity of employees utilizing such tools may be hindered.

Particular embodiments provide a social collaboration and communication tool to increase the productivity of personnel of an organization.

Figure 1:
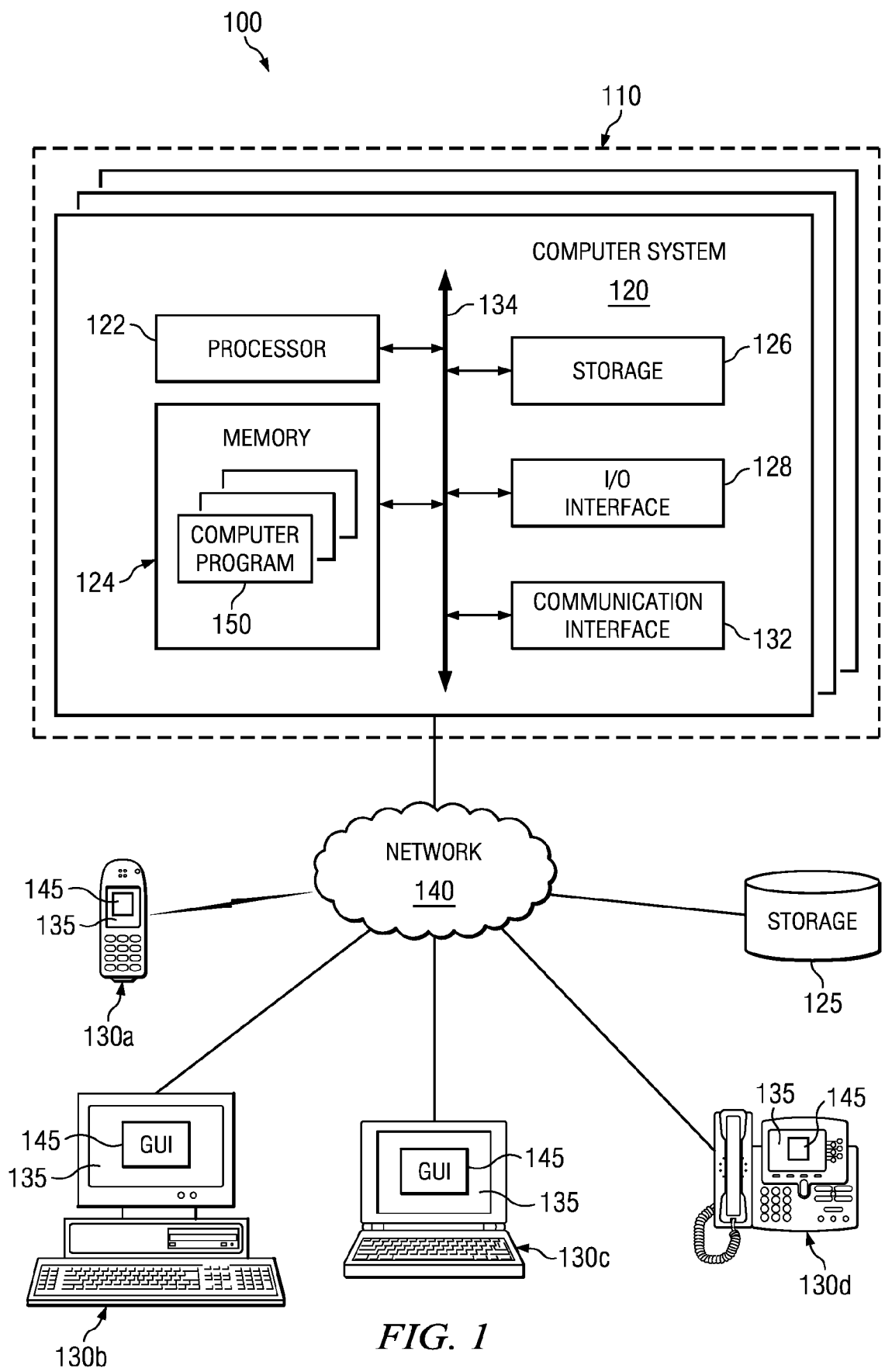
FIG. 1 illustrates an example system for social collaboration within an organization.

FIG. 1 illustrates an example system 100 for social collaboration within an organization. System 100 may include an enterprise 110, one or more computer systems 120, a network storage device 125, one or more client devices 130 (hereinafter "clients"), and a network 140. Enterprise 110, clients 130, network storage device 125, and computer systems 120 may be communicatively coupled via network 140. Computer systems 120 are generally operable to provide a system for social collaboration within an organization to clients 130, as described below.

In general, one or more computer systems 120 provide a system for social collaboration within an organization or an enterprise to users of clients 130. As used herein, "enterprise" and enterprise 110 may refer to any organization such as a business, corporation, firm, government entity, educational entity, or any other organization, regardless of the size of the organization. In some embodiments, users of clients 130 may refer to employees or personnel of enterprise 110 who wish to communicate or collaborate with other employees or personnel of enterprise 110. While FIG. 1 illustrates clients 130 outside of enterprise 110, some embodiments include certain clients 130 that physically reside within enterprise 110. Embodiments of the disclosure include clients 130 that may communicate with computer systems 120 and other clients 130 via network 140, regardless of their physical location.

Clients 130 may refer to any device that enables a user to interact with computer systems 120 in order to communicate or collaborate with other users of system 100. In some embodiments, clients 130 may include a computer, workstation, telephone, Internet browser, electronic notebook, Personal Digital Assistant (PDA), computer tablet, or any other suitable device (wireless, wireline, or otherwise), component, or element capable of receiving, processing, storing, or communicating information with other components of system 100. In some embodiments, for example, clients 130 may include a cellular telephone 130a such as a smartphone, a desktop computer 130b, a laptop computer 130c, or a digital telephone 130d such as an IP-enabled telephone. Clients 130 may also comprise any suitable user interface such as a display 135. It will be understood that system 100 may include any number and combination of clients 130.

In some embodiments, clients 130 may include a graphical user interface (GUI) 145. GUI 145 generally tailors and filters data presented by computer systems 120 to clients 130, and accepts input from users of system 100 that may be transmitted to computer systems 120. GUI 145 may comprise a plurality of displays having message areas, interactive fields, pop-ups, pull-down lists, notification areas, and buttons operated by user. GUI 145 may include multiple levels of abstraction including groupings and boundaries. It should be understood that the term GUI 145 may be used in the singular or in the plural to describe one or more GUIs 145 and each of the displays of a particular GUI 145. GUI 145 may provide users of system 100 with an efficient and user-friendly enterprise social collaboration and communications tool, as described below in reference to FIG. 11.

Embodiments of system 100 include one or more computer systems 120 that perform one or more steps of one or more methods described or illustrated herein. In particular embodiments, one or more computer systems 120 provide functionality described or illustrated herein. In particular embodiments, software running on one or more computer systems 120 performs one or more steps of one or more methods described or illustrated herein or provides functionality described or illustrated herein. Particular embodiments include one or more portions of one or more computer systems 120.

This disclosure contemplates any suitable number of computer systems 120. This disclosure contemplates computer system 120 taking any suitable physical form. As example and not by way of limitation, computer system 120 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, computer system 120 may include one or more computer systems 120; be unitary or distributed; span multiple locations; span multiple machines; or reside in a cloud, which may include one or more cloud components in one or more networks. Where appropriate, one or more computer systems 120 may perform without substantial spatial or temporal limitation one or more steps of one or more methods described or illustrated herein. As an example and not by way of limitation, one or more computer systems 120 may perform in real time or in batch mode one or more steps of one or more methods described or illustrated herein. One or more computer systems 120 may perform at different times or at different locations one or more steps of one or more methods described or illustrated herein, where appropriate.

In some embodiments, computer system 120 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computer system 120 may be a web server running web server applications such as Apache, Microsoft's Internet Information Server™, and the like.

In particular embodiments, computer system 120 includes a processor 122, memory 124, storage 126, an input/output (I/O) interface 128, a communication interface 132, and a bus 134. Although this disclosure describes and illustrates a particular computer system having a particular number of particular components in a particular arrangement, this disclosure contemplates any suitable computer system having any suitable number of any suitable components in any suitable arrangement.

In particular embodiments, processor 122 includes hardware for executing instructions, such as those making up a computer program 150. As an example and not by way of limitation, to execute instructions, processor 122 may retrieve (or fetch) the instructions from an internal register, an internal cache, memory 124, or storage 126; decode and execute the instructions; and then write one or more results to an internal register, an internal cache, memory 124, or storage 126. In particular embodiments, processor 122 may include one or more internal caches for data, instructions, or addresses. This disclosure contemplates processor 122 including any suitable number of any suitable internal caches, where appropriate. As an example and not by way of limitation, processor 122 may include one or more instruction caches, one or more data caches, and one or more translation lookaside buffers (TLBs). Instructions in the instruction caches may be copies of instructions in memory 124 or storage 126, and the instruction caches may speed up retrieval of those instructions by processor 122. Data in the data caches may be copies of data in memory 124 or storage 126 for instructions executing at processor 122 to operate on; the results of previous instructions executed at processor 122 for access by subsequent instructions executing at processor 122 or for writing to memory 124 or storage 126; or other suitable data. The data caches may speed up read or write operations by processor 122. The TLBs may speed up virtual-address translation for processor 122. In particular embodiments, processor 122 may include one or more internal registers for data, instructions, or addresses. This disclosure contemplates processor 122 including any suitable number of any suitable internal registers, where appropriate. Where appropriate, processor 122 may include one or more arithmetic logic units (ALUs); be a multi-core processor; or include one or more processors 122. Although this disclosure describes and illustrates a particular processor, this disclosure contemplates any suitable processor.

In particular embodiments, memory 126 includes main memory for storing instructions such as computer program(s) 150 for processor 122 to execute, or data for processor 122 to operate on. As an example and not by way of limitation, computer system 120 may load instructions from storage 126 or another source (e.g., another computer system 120 or network storage device 125) to memory 124. Processor 122 may then load the instructions from memory 124 to an internal register or internal cache. To execute the instructions, processor 122 may retrieve the instructions from the internal register or internal cache and decode them. During or after execution of the instructions, processor 122 may write one or more results (which may be intermediate or final results) to the internal register or internal cache. Processor 122 may then write one or more of those results to memory 124. In particular embodiments, processor 122 executes only instructions in one or more internal registers or internal caches or in memory 124 (as opposed to storage 126 or elsewhere) and operates only on data in one or more internal registers or internal caches or in memory 124 (as opposed to storage 126 or elsewhere). One or more memory buses (which may each include an address bus and a data bus) may couple processor 122 to memory 124. Bus 134 may include one or more memory buses, as described below. In particular embodiments, one or more memory management units (MMUs) reside between processor 122 and memory 124 and facilitate accesses to memory 124 requested by processor 122.

In certain embodiments, instructions executed by processor 122 may reside in one or more computer programs 150. Computer program 150 generally refers to instructions, logic, rules, algorithms, code, tables, or other suitable instructions for performing the described functions and operations. In some embodiments, computer programs 150 may be stored in memory 124, storage 126, network storage device 125, or any other location accessible to computer system 120. Where appropriate, computer program 150 may include one or more computer programs 150; be unitary or distributed; span multiple locations; span multiple machines; or reside in a cloud.

In particular embodiments, storage 126 includes mass storage for data or instructions such as computer program 150. As an example and not by way of limitation, storage 126 may include an HDD, a floppy disk drive, flash memory, an optical disc, a magneto-optical disc, magnetic tape, a Universal Serial Bus (USB) drive, a solid-state drive (SSD), or a combination of two or more of these. Storage 126 may include removable or non-removable (or fixed) media, where appropriate. Storage 126 may be internal or external to computer system 120, where appropriate. In particular embodiments, storage 126 is non-volatile, solid-state memory. In particular embodiments, storage 126 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage 126 taking any suitable physical form. Storage 126 may include one or more storage control units facilitating communication between processor 122 and storage 126, where appropriate. Where appropriate, storage 126 may include one or more storage devices 126. Although this disclosure describes and illustrates particular storage, this disclosure contemplates any suitable storage.

In particular embodiments, I/O interface 128 includes hardware, software, or both providing one or more interfaces for communication between computer system 120 and one or more I/O devices. System 100 may include one or more of these I/O devices, where appropriate. One or more of these I/O devices may enable communication between a person and computer system 120. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 128 for them. Where appropriate, I/O interface 128 may include one or more device or software drivers enabling processor 122 to drive one or more of these I/O devices. I/O interface 128 may include one or more I/O interfaces 128, where appropriate. Although this disclosure describes and illustrates a particular I/O interface, this disclosure contemplates any suitable I/O interface.

In particular embodiments, communication interface 132 includes hardware, software, or both providing one or more interfaces for communication (e.g., packet-based communication) between computer system 120 and one or more other computer systems 120 or one or more networks. As an example and not by way of limitation, communication interface 132 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 132 for it. As an example and not by way of limitation, computer system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 120 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 120 may include any suitable communication interface 132 for any of these networks, where appropriate. Communication interface 132 may include one or more communication interfaces 132, where appropriate. Although this disclosure describes and illustrates a particular communication interface, this disclosure contemplates any suitable communication interface.

In particular embodiments, bus 134 includes hardware, software, or both coupling components of computer system 120 to each other. As an example and not by way of limitation, bus 134 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 134 may include one or more buses 134, where appropriate. Although this disclosure describes and illustrates a particular bus, this disclosure contemplates any suitable bus or interconnect.

In some embodiments, network storage device 125 may refer to any suitable device communicatively coupled to network 140 and capable of storing and facilitating retrieval of data or instructions. Examples of network storage device 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database or network storage (for example, a server), or any other volatile or non-volatile computer-readable memory devices that store one or more files, lists, tables, or other arrangements of information. In certain embodiments, network storage device 125 may be a SQL Server database, an Oracle database, and the like.

In certain embodiments, network 140 may refer to any interconnecting system capable of transmitting audio, video, signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In operation, computer systems 120 provide an enterprise social collaboration tool to users of system 100 via clients 130. For example, FIG. 11 discussed below illustrates a screenshot of an embodiment of GUI 145 that users of system 100 may utilize to communicate and collaborate with other users of system 100 in an enterprise environment. Elements presented in GUI 145 may be generated by one or more computer systems 120 of enterprise 110 by executing instructions such as one or more computer programs 150. For example, FIG. 2 discussed below illustrates an example embodiment of a computer program 150 that may be utilized by one or more computer systems 120 to generate content provided by GUI 145. In addition, FIGS. 3, 5, and 7 discussed below illustrate particular embodiments of storage 126 and network storage devices 125 that may be utilized by one or more computer systems 120 to generate content provided by GUI 145.

Figure 2:
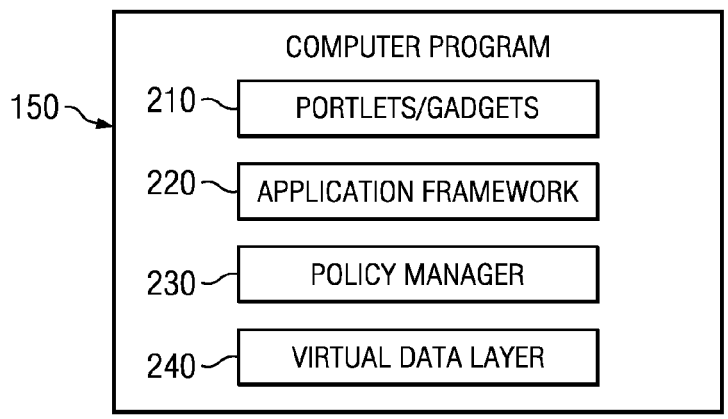
FIG. 2 illustrates an example computer program for social collaboration within an organization.

FIG. 2 illustrates an example computer program 150 for social collaboration within an organization. Computer program 150 may be utilized by one or more computer systems 120 to generate content provided on GUI 145 of clients 130. In some embodiments, computer program 150 may communicate with clients 130 using any networking protocol such as the Hypertext Transfer Protocol (HTTP), Bidirectional-streams over Synchronous HTTP (BOSH), and the like. In some embodiments, computer program 150 may include one or more logical units including, but not limited to, a portlets/gadgets layer 210, an application framework 220, a policy manager 230, and a virtual data layer 240. In certain embodiments, computer program 150 may be a Java 2 Platform, Enterprise Edition (J2EE) application.

In certain embodiments, application framework 220 may refer to code or logic to manage portlets/gadgets layer 210, policy manager 230, virtual data layer 240, deployment infrastructure 250, and any other portion of computer program 150 in order to generally provide an enterprise social collaboration tool to users of system 100 via clients 130. Application framework 220 may utilize any appropriate standard/protocol/technology including, but not limited to, Java Specification Requests (JSRs), OpenSocial, J2EE, Spring, Quartz, Cisco Single Sign On (SSO), Extensible Messaging and Presence Protocol (XMPP), BOSH, and the like.

In certain embodiments, computer program 150 may include portlets/gadgets layer 210. Portlets/gadgets layer 210 may include logic to provide users of system 100 the ability to add, delete, drag and drop, or rearrange various gadgets on GUI 145. In certain embodiments, portlets/gadgets layer 210 may include one or more gadget applications, one or more portlet applications, and a portlet/gadget manager (not show). Gadgets that may be available on GUI 145 may include any type of gadget such as any open social gadget. In certain embodiments, portlets/gadgets layer 210 may utilize the Web Services for Remote Portlets (WSRP) protocol. In certain embodiments, portlets/gadgets layer 210 may utilize WSRP for communications between for one portlet container and another portlet container in order to render the portlet running in a remote container on GUI 145.

In certain embodiments, policy manager 230 may refer to code/logic to control, implement, and manage various policies utilized by computer program 150. For example, policy manager 230 may control how and when users of clients 130 may view content created and shared by other users of clients 130. Embodiments of policy manager 230 are described in more detail below with respect to FIG. 20.

In certain embodiments, virtual data layer 240 may provide computer program 150 with the functionality to communicate with various data stores such as those stored in memory 124, storage 126, or network storage device 125. Particular embodiments of data stores in which virtual data layer 240 may interface are described below in reference to FIG. 3. Virtual data layer 240 may provide various functionality with respect to the data stores, including, but not limited to, data store abstraction using Java Data Objects (JDO), content repository abstraction, a video portal interface, or semantic abstraction. Virtual data layer 240 may utilize any appropriate standard/protocol including, but not limited to, Java Database Connectivity (JDBC), Hibernate, MemCacheD, RDF2GO, Lightweight Directory Access Protocol (LDAP), and Web-Services.

In certain embodiments, computer program 150 may additionally include a deployment infrastructure used to provide content to GUI 145 on clients 130. Deployment infrastructure 250 may utilize any appropriate standard/protocol, including, but not limited to, UCS, Cisco ACE, Cisco Wide Area Application Services (WAAS), VMWare, and the like.

Figure 3:
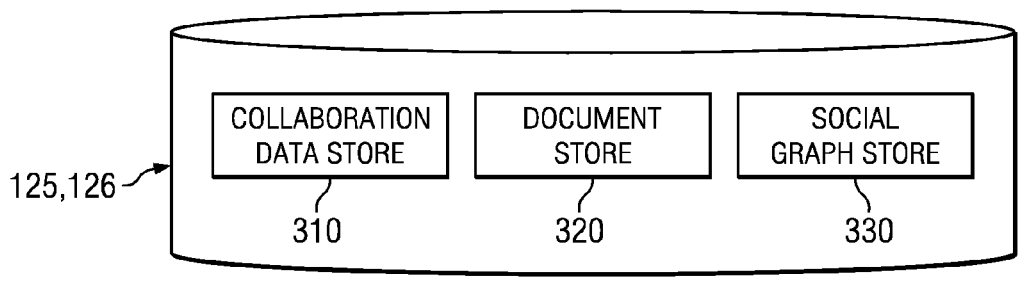
FIG. 3 illustrates example data stores for social collaboration within an organization.

In certain embodiments, virtual data layer 240 of computer program 150 provides an interface to various data stores in memory 124, storage 126, or network storage device 125. For example, FIG. 3 illustrates example data stores for social collaboration within an organization. As illustrated in FIG. 3, certain embodiments of memory 124, storage 126, and network storage device 125 may include a collaboration data store 310, a document store 320, and a social graph store 330. In certain embodiments, data stores 310-330c may reside in a SQL Server database, an Oracle database, a MySQL database, an Apache Solr database, a Java Content Repository (JCR), or any other appropriate repository. In certain embodiments, data stores 310-330c may be parallel data stores. While FIG. 3 illustrates data stores 310-330 residing in storage 126 or network storage device 125, it should be understood that data stores 310-330 may be located anywhere accessible to computer system 120 and may not necessarily all reside within the same location/storage device.

In certain embodiments, collaboration data store 310 may refer to a main repository for data utilized by computer program 150 in providing an enterprise social collaboration system and method according to the teachings of the disclosure. For example, collaboration data store 310 may store people (i.e., users), communities, wiki content, blog content, or any other data generated by or associated with users of system 100. In certain embodiments, collaboration data store 310 may include data from an LDAP directory. In certain embodiments, document store 320 may refer to a repository for any document or attachment uploaded by users of system 100. For example, any data file attached to an email, blog, wiki article, and the like may be stored in document store 320. In certain embodiments, social graph store 330 may store data associated with connection between people (users), communities, and information in system 100. Certain embodiments of social graph store 330 are discussed in detail below in reference to FIGS. 4-6.

Figure 4:
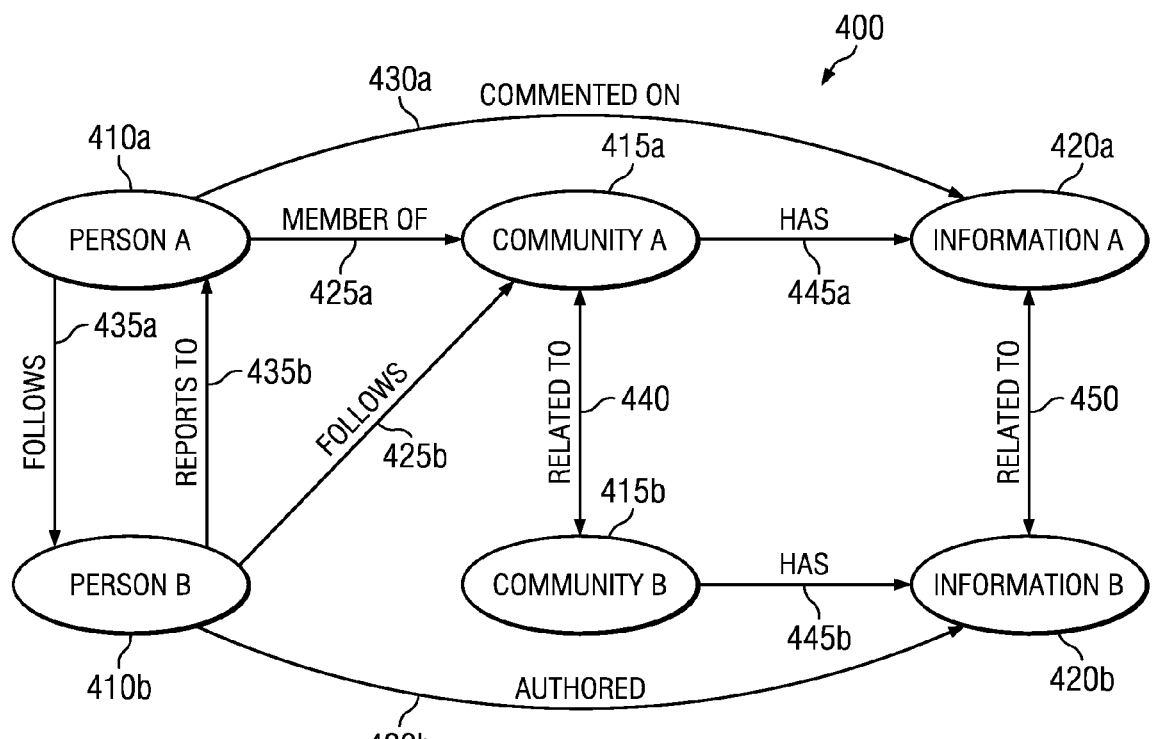
FIG. 4 illustrates an example dynamic social graph for social collaboration within an organization.

FIG. 4 illustrates an example dynamic social graph 400 for social collaboration within an organization. Dynamic social graph 400 may be stored in social graph store 330 and utilized by computer program 150 in providing an enterprise social collaboration system and method according to the teachings of the disclosure. Typical social software applications have traditionally focused only on people-to-people connections in providing social collaboration and communications solutions. Dynamic social graph 400, however, offers enhanced social connectivity to organizations such as enterprises, companies, and groups by providing connections equally between people, communities, and information, as described in more detail below.

In certain embodiments, dynamic social graph 400 includes one or more person nodes 410, one or more community nodes 415, one or more information nodes 420, and connections 425-450 representing relationships between person nodes 410, community nodes 415, and information nodes 420. Connections 425-450 may include, for example, person-to-community connections 425, person-to-information connections 430, person-to-person connections 435, community-to-community connections 440, community-to-information connections 445, and information-to-information connections 450, as described below.

Person nodes 410 represent people within an enterprise or connected enterprise that may form working relationships together by using dynamic social graph 400. For example, people within an enterprise can be owners or members of a community. Additionally or alternatively, people within an enterprise can publish information individually or as part of a community. Community nodes 415 represent communities of interest, teams, or workgroups within an enterprise. In certain embodiments, community nodes 415 are owned by people within the enterprise and contain people and information. Information nodes 420 represent any published information or unit of content within an enterprise. In certain embodiments, information nodes 420 have a person or community as an owner. Examples of information represented by information nodes 420 include, but are not limited to, any format of groupware documents, blogs, wiki articles, microblogs, emails, instant messages (individual or group), audio/video transcripts, voice messages, and the like.

Dynamic social graph 400 includes mappings between person nodes 410, community nodes 415, and information nodes 420 based on the interrelationships among the users, communities, and units of content within an enterprise. A connection between a person and a community is represented in dynamic social graph 400 by person-to-community connections 425. For example, person-to-community connection 425a may be added to dynamic social graph 400 when person node 410a becomes a member of community node 415a. As another example, person-to-community connection 425b may be added to dynamic social graph 400 when person node 410b chooses to follow or "favorite" or follow community node 415b. In certain embodiments, person-to-community connections 425 are expressed using friend of a friend (FOAF) vocabulary.

A connection between a person and information is represented in dynamic social graph 400 by person-to-information connections 430. For example, person-to-information connection 430a may be added to dynamic social graph 400 when person node 410a posts a comment about information node 420a. As another example, person-to-community connection 430b may be added to dynamic social graph 400 when person node 410b authors content represented by information node 420b. In general, person-to-information connection 430a may be added to dynamic social graph 400 when a person node 410 performs any action within system 100 on any information node 420 such as a blog, a wiki page, a discussion forum entry, a task, an action item, a tag, a category, and the like. In certain embodiments, person-to-information connections 430 are expressed using semantically-interlinked online communities project (SIOC) vocabulary.

A connection between a person and another person is represented in dynamic social graph 400 by person-to-person connections 435. For example, person-to-person connection 435a may be added to dynamic social graph 400 when person node 410a chooses to follow or "favorite" person node 410a. As another example, person-to-person connection 435b may be added to dynamic social graph 400 to indicate that person node 410b reports to person node 410a. In certain embodiments, person-to-person connections 435 may be added to dynamic social graph 400 by retrieving information from a LDAP directory. For example, information in an LDAP directory may be used to populate dynamic social graph 400 with person-to-person connections 435 in order to capture a reporting structure of an organization (i.e., who reports to who), the members of a workgroup or team, or any other relationship between employees of an organization. In certain embodiments, person-to-person connections 435 are expressed using FOAF vocabulary.

A connection between a community and another community is represented in dynamic social graph 400 by community-to-community connections 440. For example, community-to-community connection 440 may be added to dynamic social graph 400 when it is determined that community node 415a is related to community node 415b. In one embodiment, for example, it may be determined that community node 415a is related to community node 415b by determining the members of each of the community nodes and then determining that a predetermined percentage of the members of community node 415a are also members of community node 415b. In some embodiments, it may be determined that community node 415a is related to community node 415b by analyzing the connections to each of the nodes and determining that each of the nodes have similar or overlapping connections.

A connection between a community and information is represented in dynamic social graph 400 by community-to-information connections 445. For example, community-to-information connections 445 may be added to dynamic social graph 400 when it is determined that community node 415a has created content represented by information node 420a. For example, when a member of community node 415a creates a wiki page represented by information node 420a that may be edited by all members of community node 415a, community-to-information connection 445a may be added to dynamic social graph 400 to indicate that community 415a has the associated wiki page.

A connection between an information node and another information node is represented in dynamic social graph 400 by information-to-information connections 450. For example, information-to-information connections 450 may be added to dynamic social graph 400 when it is determined that information node 420a is related to information node 420b. In one embodiment, for example, it may be determined that information node 420a is related to information node 420b by determining one or more topics associated with each of the nodes and then determining that the topics are related. In some embodiments, it may be determined that information node 420a is related to information node 420b by considering the Description of a Project (DOAP) ontology.

In certain embodiments, person-to-person connections 435 and the other connections of dynamic social graph 400 may be expressed using the "foaf:knows" property. For example, if "Bob" has some defined relationship with "John," dynamic social graph 400 may record this relationship using the ":Bob foaf:knows:John" vocabulary. In certain embodiments, dynamic social graph 400 may utilize extensions using the "RELATIONSHIP" vocabulary. For example, if "Bob" works with "John," dynamic social graph 400 may record this relationship using the ":Bob rel:worksWith:John" vocabulary. In certain embodiments, RDFS inferencing may be utilized to answer queries using "foaf:knows" when people use "rel:*" alternatives.

Figure 5:
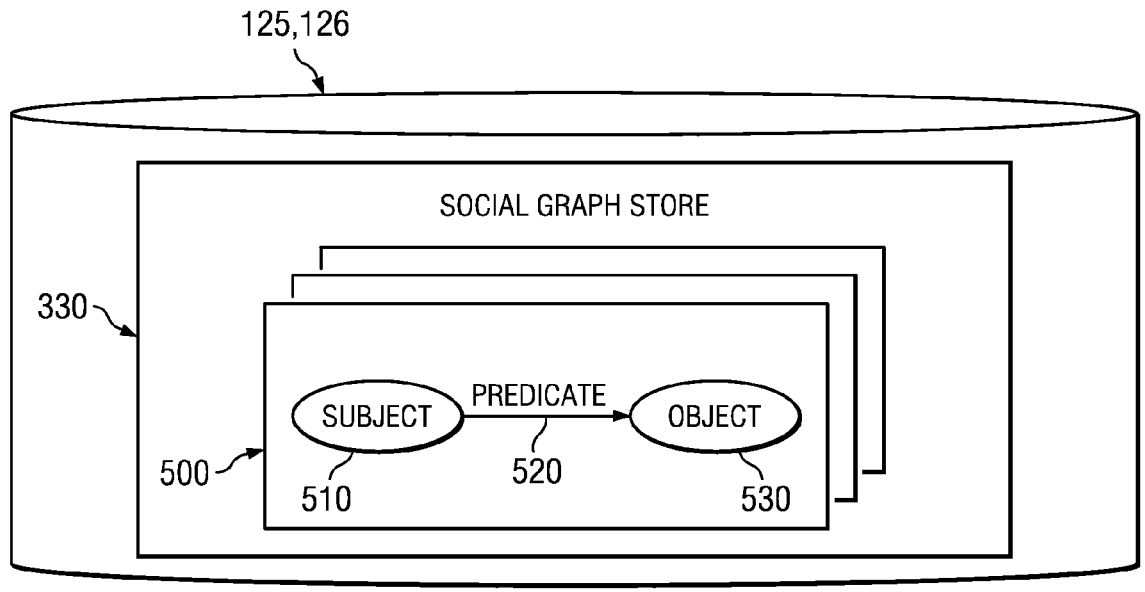
FIG. 5 illustrates an example data store for a dynamic social graph.

As described above, dynamic social graph 400 may be stored in social graph store 330. In certain embodiments, social graph store 330 may include a Resource Description Framework (RDF) store and computer program 150 may utilize the SPARQL Protocol and RDF Query Language (SPARQL) to retrieve content from social graph store 330. For example, FIG. 5 illustrates an example data store 330 for a dynamic social graph. In certain embodiments, social graph store 330 utilizes RDF. In this embodiment, connections 425-450 of FIG. 4 are stored in social graph store 330 as collections of "triples" 500 that create a labeled graph of relations between resources and literal values. Each triple 500 includes a subject 510, a predicate 520, and an object 530. As an example, if a user "Bob" joins community "A", triple 500 may be created in social graph store 330 with a subject 510 of "Bob," a predicate 520 of "joined" or similar, and an object 530 of "community A." As another example, if a user "Bob"

reports to "John", triple 500 may be created in social graph store 330 with a subject 510 of "Bob," a predicate 520 of "reports to" or similar, and an object 530 of "John." As a result, a schema-less data model is implemented that features unambiguous identifiers and named relations between pairs of resources.

In operation, dynamic social graph 400 grows in real-time as users of system 100 add relationships and content. As an example, if user "Bob" creates a new blog entry and publishes it, multiple nodes and connections will be added to dynamic social graph 400 in real-time. In this example, a person node 410 is added to dynamic social graph 400 if Bob has not had any interaction or activity with system 100 in the past. However, if a person node 410 representing Bob already exists in dynamic social graph 400, no new person node 410 will be created for Bob. In addition, an information node 420 is added to dynamic social graph 400 that represents the new blog entry. Finally, a person-to-information connection 430 is added to dynamic social graph 400 between Bob's person node 410 and the new blog entry's information node 420 to indicate that Bob authored the new blog entry. As a result, Bob's relationship with the new blog entry is recorded in dynamic social graph 400 and may be immediately available to computer program 150.

In certain embodiments, a search engine such as SOLR or FAST may be used to index data within dynamic social graph 400 in order to improve the performance of searches of the graph. In general, dynamic social graph 400 may be used as a platform to promote linked searches and recommendations by matching people, communities, and information in any combination. The use of dynamic social graph 400 in this way promotes collaboration in an organization by enabling users to search or navigate the graph to get to relevant solutions. For example, consider an example where a user is seeking an answer to the question: "What version of Product XYZ supports feature A?" In this example, the user might perform a search using the search terms "Product XYZ feature A." Dynamic social graph 400 allows such a search to display not only information associated with these search terms, but also allows the discovery and display of the people who created this information and communities in which the information is maintained. As a result, dynamic social graph 400 reduces the need for explicit searches for multiple entities by allowing a search result to return related data.

In certain embodiments, results of the searches performed on dynamic social graph 400 may be passed through a policy filter where only the proper results are shown to the user according to a corresponding policy. One embodiment of a policy engine that may be utilized to filter the search results is discussed below in reference to FIG. 20. In certain embodiments, other factors or contextual information may be utilized in searching dynamic social graph 400. As an example, the GPS location of the searching user may be input as an element of the search criteria/filter. In this example, if user Bob's GPS location is currently in San Jose, then the search results could return users who are physically in San Jose or within a certain distance thereof. In another example, the current status of users can be used as an additional search criteria/filter in searching dynamic social graph 400. For example, if Bob is looking for an expert in Java, then he may be returned a list of such experts current status is "available," thus indicating to Bob that he may attempt to contact them immediately.

Figure 6:
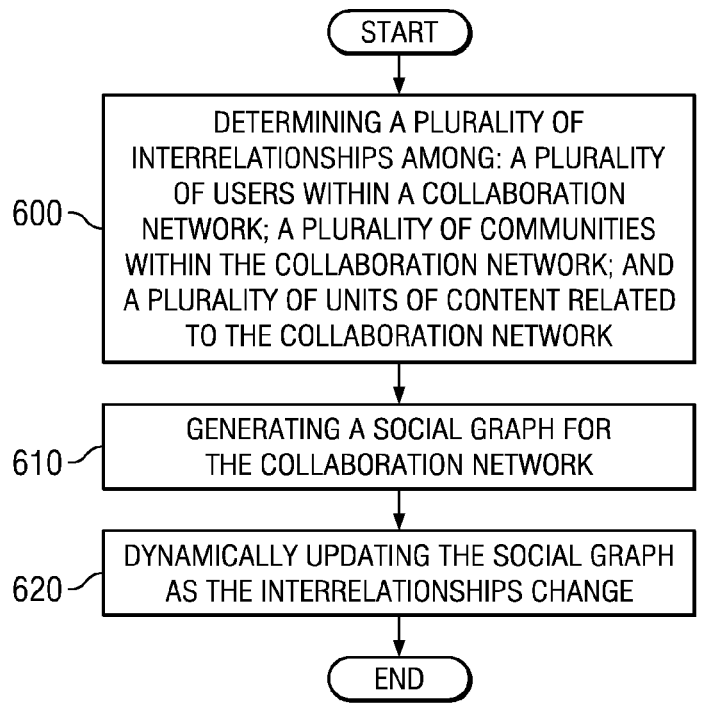
FIG. 6 illustrates an example method for generating a dynamic social graph.

FIG. 6 illustrates an example method for generating a dynamic social graph such as social graph 400 described above. The method may start at step 600, where a plurality of interrelationships are determined. In certain embodiments, the interrelationships of step 600 are connections 435-450, as described above. In certain embodiments, the interrelationships of step 600 are determined among a plurality of users within a collaboration network, a plurality of communities within the collaboration network, and a plurality of units of content related to the collaboration network. In certain embodiments, the units of content include a bookmark, a document, a wiki article, a video, a podcast, a blog, a post 710 as described below, an activity, and the like.

At step 610, a social graph for the collaboration network is generated. In certain embodiments, the social graph generated in step 610 is an RDF graph. In certain embodiments, the social graph generated in step 610 includes a plurality of nodes that each represent one of the users, one of the communities, or one of the units of content. In certain embodiments, the nodes of the social graph generated in step 610 are nodes 410-420 as illustrated in FIG. 4 and described above. In certain embodiments, the social graph generated in step 610 includes a mapping of the nodes to each other based on the interrelationships among the users, communities, and units of content. For example, the mapping may include connections 425-450 described above.

At step 620, the social graph generated in step 610 is dynamically updated as the interrelationships change. For example, the social graph generated in step 610 may be dynamically updated when a person such as person node 410a becomes a member of a community such as community node 415a. As another example, person-to-community connection 425b may be added to dynamic social graph 400 when person node 410b chooses to follow or "favorite" community node 415b.

Although this disclosure describes and illustrates particular steps of the method of FIG. 6 as occurring in a particular order, this disclosure contemplates any suitable steps of the method of FIG. 5 occurring in any suitable order. Moreover, although this disclosure describes and illustrates particular components carrying out particular steps of the method of FIG. 6, this disclosure contemplates any suitable combination of any suitable components carrying out any suitable steps of the method of FIG. 6.

In typical social collaboration systems, users utilize different tools in order to publish content in multiple different formats. For example, users typically utilize a wiki tool in order to author or edit a wiki page, a blog tool to author or edit a blog entry, a discussion forum tool to author or edit a discussion entry, and the like. Typical social collaboration systems, however, have many limitations and drawbacks, especially in the enterprise social networking context. First, users may become confused in selecting an appropriate tool for a particular job. Users may not be aware about the difference between wikis, blogs, and discussion forums and therefore may be confused as to which tool to utilize. Second, once content is created in one of the various formats, it is not convenient or practical to convert the content into one of the other formats. For example, once a blog entry is published, a user may then wish to convert the blog entry into a wiki so that other users may edit it. As another example, content that begins as a discussion may need to be promoted to an official blog post when the group has converged on a discussion. Typical collaboration systems, however, do not allow users to easily convert from one format to another. Finally, typical wiki, blog, and discussion forum applications are usually contained within a community and cannot be shared across communities except by cross posting. This, however, creates duplication of content and thus creates unnecessary storage requirements.

The teachings of the disclosure recognize that it would be desirable to provide a unified content model that addresses the above limitations of existing social collaboration systems. FIGS. 7 through 10 below illustrate a unified content model according to the teachings of the disclosure that allows easy sharing of content across multiple people and communities.

Figure 7:
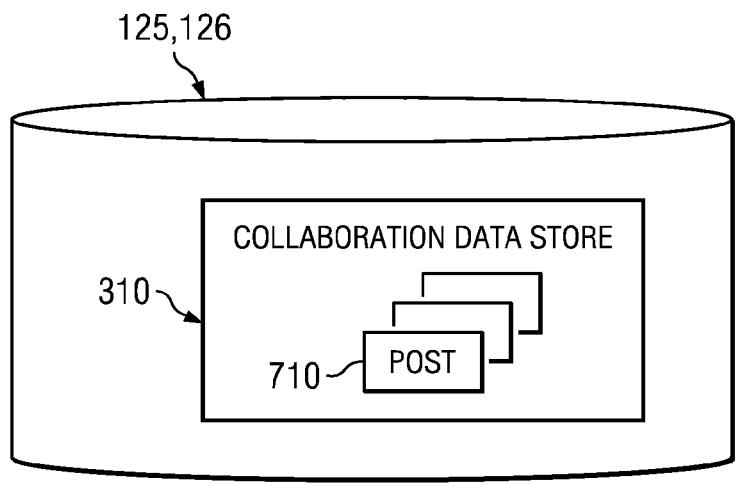
FIG. 7 illustrates an example collaboration data store.

FIG. 7 illustrates an example collaboration data store 310. In certain embodiments, collaboration data store 310 may store one or more units of content 710 (hereinafter "posts") that may take the form of any of a wiki page, a blog entry, or a discussion forum based on how a user chooses to allow access to post 710. In addition, posts 710 may simultaneously behave like one or more of a wiki page, a blog entry, or a discussion forum for different sets of people. While posts 710 are shown residing in collaboration data store 310, it should be understood that posts 710 may be stored anywhere that is accessible to computer program 150 and computer systems 120.

In operation, a user may create a post 710 by utilizing GUI 145 on any client 130. An example embodiment of GUI 145 that a user may utilize to create a post 710 is illustrated below in reference to FIG. 8. Posts 710 allow a user to create a single multi-media unit of content having a title and a body without worrying about choosing a particular tool and format. After creating the post but prior to publication, a user may then simply specify access parameters for post 710 in order to control how post 710 behaves in system 100. Example access parameters for posts 710 include choosing people and communities who will be allowed to access post 710 and view, comment, edit, and share permissions for each person/community.

Figure 8:
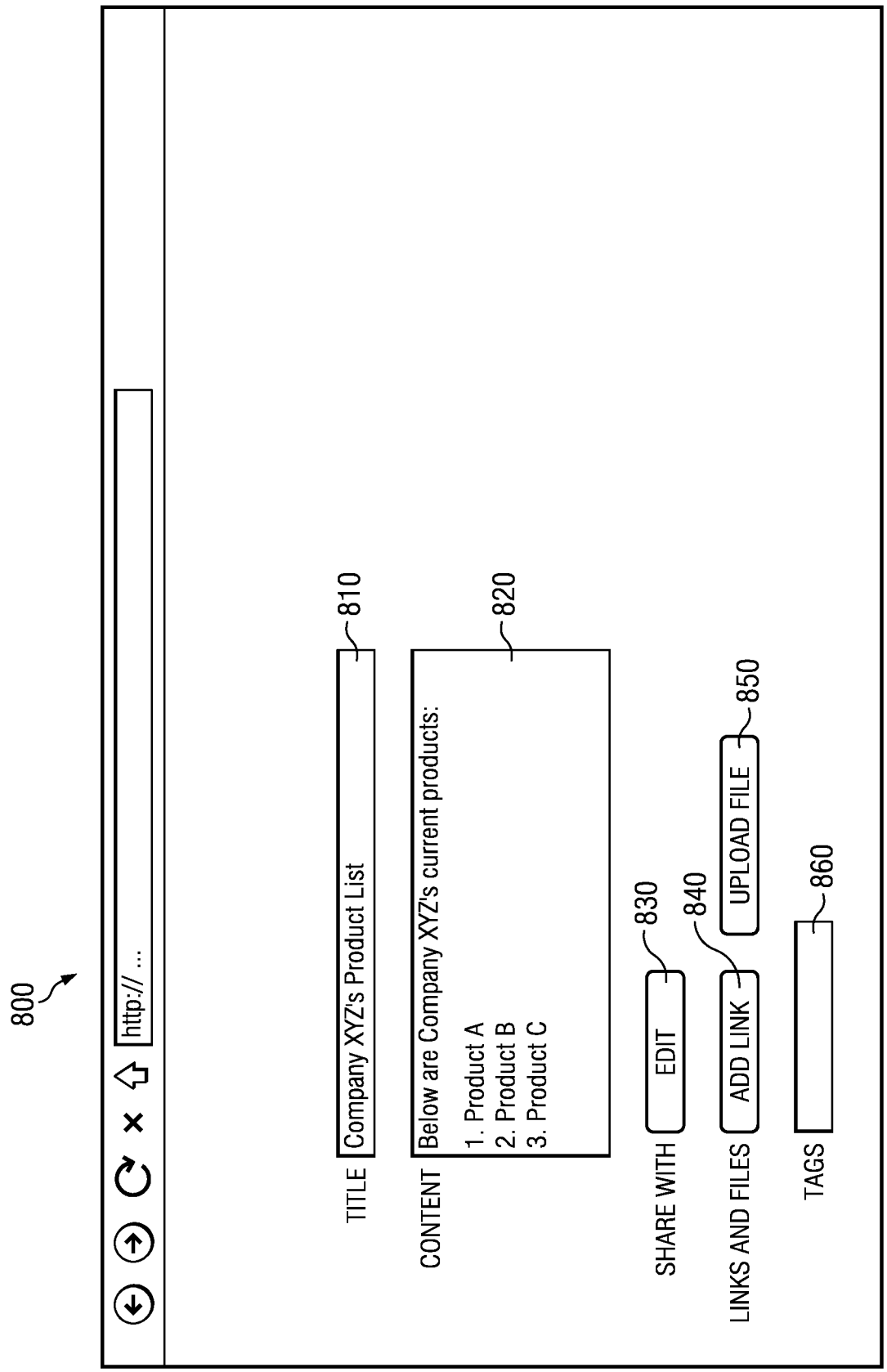
FIG. 8 illustrates an example graphical user interface (GUI) for generating content for social collaboration within an organization.

FIG. 8 illustrates an example GUI for generating content for social collaboration within an organization. The GUI of FIG. 8 includes a webpage 800 that provides users of clients 130 an interface to create posts 710. In certain embodiments, webpage 800 may be GUI 145 on clients 130. In certain embodiments, webpage 800 includes a title input area 810, a content input area 820, an edit sharing options icon 830, an add link icon 840, an upload file icon 850, and a tag input area 860. While FIG. 8 illustrates a particular arrangement of title input area 810, content input area 820, edit sharing options icon 830, add link icon 840, upload file icon 850, and tag input area 860, other embodiments of webpage 800 may have any appropriate arrangement, selection, or design of title input area 810, content input area 820, edit sharing options icon 830, add link icon 840, upload file icon 850, and tag input area 860.

Title input area 810 may refer to any appropriate input area where a user may enter text as a title of post 710. Content input area 820 may refer to any appropriate input area where a user may enter text as the content of post 710. For example, if a user wishes to create a wiki page, blog entry, or discussion forum entry having a title of "Company XYZ's Product List," the user may first enter this title in title input area 810. The user may then input the appropriate content for this subject in content input area 820. In certain embodiments, content input area 820 may additionally include icons (not shown) for formatting content that is entered into content input area 820. For example, content input area 820 may include one or more icons to format the appearance of the text in content input area 820, an icon to insert a video into content input area 820, an icon to add or delete a hyperlink in content input area 820, and the like.

Add link icon 840 may refer to an icon, hyperlink, or button on webpage 800 that a user may push in order to attach to post 710 a link to another webpage. Upload file icon 850 may refer to an icon, hyperlink, or button on webpage 800 that a user may push in order to attach to post 710 a file such as a document or spreadsheet. Tag input area 860 may refer to an area where a user may assign a tag to post 710. In certain embodiments, a tag entered into tag input area 860 may be a tag created by a user or a tag selected from a drop-down list.

Figure 9:
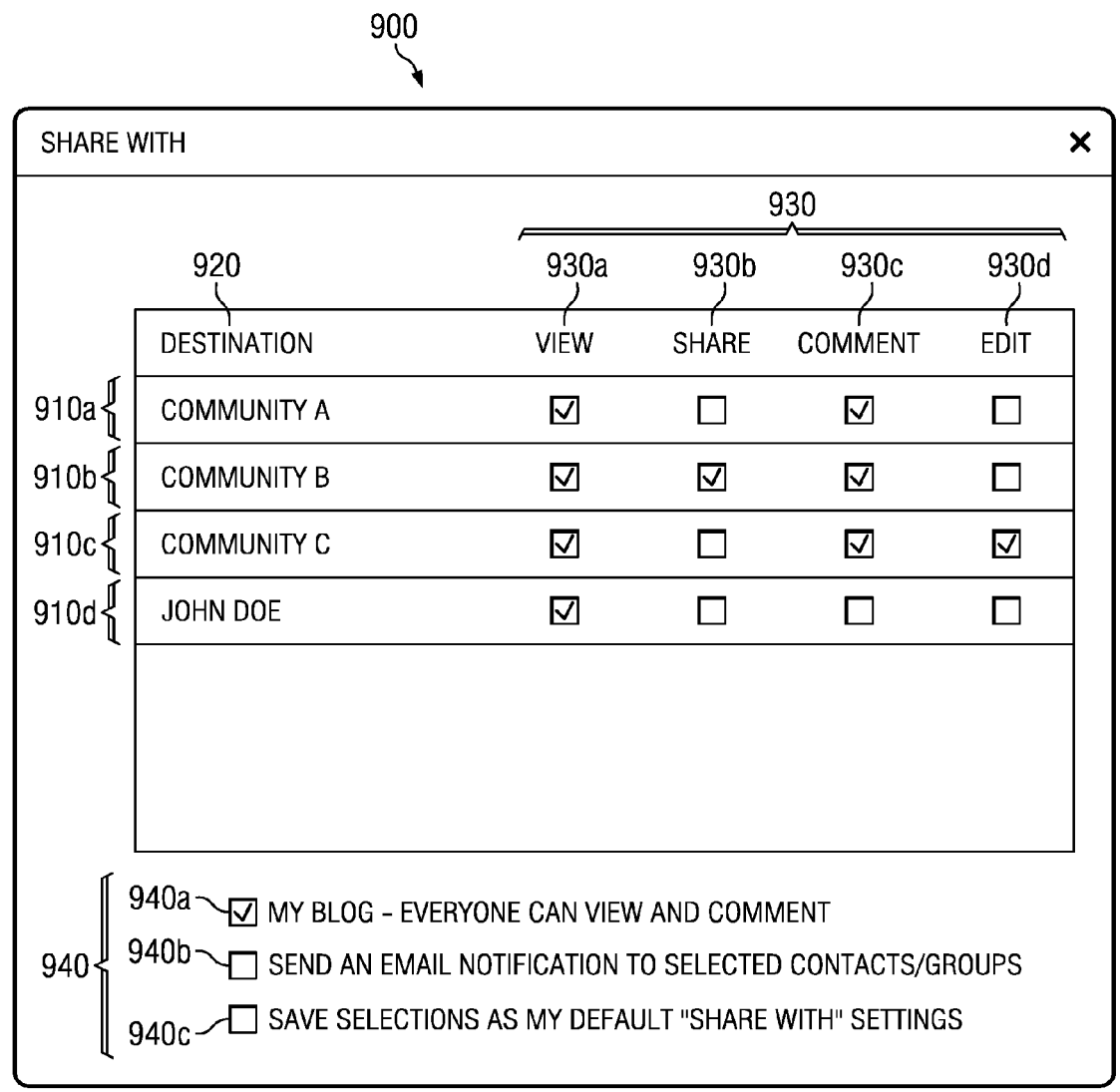
FIG. 9 illustrates an example GUI for controlling access to content for social collaboration within an organization.

Edit sharing options icon 830 refers to an icon, hyperlink, or button on webpage 800 that a user may select in order to edit access options for post 710. As an example, FIG. 9 illustrates an example GUI for controlling access to content for social collaboration within an organization. FIG. 9 illustrates one embodiment of a post access options interface 900 that may be utilized to control access to post 710. Post access options interface 900 may be implemented as a pop-up on webpage 800 and may appear when a user selects edit sharing options icon 830. Post access options interface 900 includes one or more policies 910 and one or more options 940, as described below.

Each policy 910 may refer to access options for a particular entity within the enterprise such as another user or community. Each policy 910 may include a destination 920 and one or more attributes 930. Destination 920 may refer to an entity within the enterprise that the particular policy 910 is directed to. In some embodiments, for example, destination 920 may be a community, a contact of the sender, or any other user within the enterprise that the sender has a connection to. Attributes 930 may refer to various options that the author of post 710 may select in order to control how the entity of destination 920 will have access to post 710. Example attributes 930 may include a "view" attribute 930a that allows destination 920 to view post 710, a "share" attribute 930b that allows destination 920 to share post 710 with other entities, a "comment" attribute 930c that allows destination 920 to comment on post 710, and an "edit" attribute 930d that allows destination 920 to edit post 710.

In certain embodiments, post access options interface 900 may include one or more options 940. For example, some embodiments may include a check-box option 940a that the author of post 710 may select in order to allow anyone within the enterprise to view and comment on post 710. Some embodiments may include a check-box option 940b that will enable the sending of an email notification to selected contacts/groups. Some embodiments may include a check-box option 940c that will save the selected options/selections as default settings for future posts 710.

In certain embodiments, posts 710 may be created for any unit of content that a user wishes to share with another user without utilizing webpage 800. For example, any unit of content such as a bookmark, an image, a document, a video, and the like may be shared using posts 710. To do so, a simpler webpage 800 than illustrated in FIG. 8 may be presented to the user that does not include title input area 810, content input area 820, and the like. Instead, the user may be presented with a webpage 800 that simply allows the user to provide the unit of content such as a bookmark, an image, a document, a video, and the like. Then, computer system 120 may in the background create a post 710 that only includes the provided unit of content and store the created post 710 in a data store such as collaboration data store 310.

In operation, a user controls whether post 710 behaves like one or more of a wiki, blog, and discussion forum within system 100 by selecting access options using post access options interface 900. For example, a user may create a post 710 by first entering a title such as "Company XYZ's Product List" in title input area 810 on webpage 800. The user may then input the appropriate content for post 710 in content input area 820. Optionally, the user may also add a link to post 710 using add link icon 840, attach a file to post 710 using upload file icon 850, or add a tag to post 710 using tag input area 860. Once post 710 is ready for publishing, the user may then select edit sharing options icon 830 in order to view post access options interface 900 and select access options for post 710. Based on the selected access options, post 710 may have the characteristics of a wiki, blog, or discussion forum any may simultaneously behave like one or more of these for different sets of people.

As one example, a user may wish to create a post 710 that behaves like a blog. In this example, the user may select check-box option 940a to allow everyone to view and comment on post 710 and de-select all other attributes 930. If, however, the user wishes to create a post 710 that behaves like a blog but is viewable only to Community B, the user may only select "view" attribute 930a, "share" attribute 930b, and "comment" attribute 930c for Community B as illustrated in policy 910b.

As another example, a user may wish that post 710 behave additionally/alternatively as a wiki page for Community C. In this example, the user may select "view" attribute 930a, "comment" attribute 930c, and "edit" attribute 930d for Community C, as illustrated in policy 910c. As a result, post 710 will behave like a wiki page to Community C wherein all members of Community C will be able to view and edit post 710.

As another example, a user may wish that post 710 behave additionally/alternatively as a discussion forum for Community A. In this example, the user may select "view" attribute 930a and "comment" attribute 930c for Community A, as illustrated in policy 910a. As a result, post 710 will behave like a discussion forum to Community A wherein all members of Community A will be able to view and comment on post 710.

As another example, a user may wish that post 710 be additionally/alternatively sent to user John Doe as a message. In this example, the user may select "view" attribute 930a for John Doe, as illustrated in policy 910d. As a result, post 710 will behave like an email message to John Doe. This example illustrates one advantage of posts 710 over typical email messages. Here, the user chose not to allow John Doe to share post 710 with anyone else by not selecting "share" attribute 930b. Typical email messages, however, do not allow a user to control how an email message is shared and thus any recipient of a typical email message may forward the email message to anyone he chooses.

By utilizing attributes 930 and policies 910 of post access options interface 900, a user may have explicit control over who has access to post 710. As a result, posts 710 may take the form of a wiki page, a blog entry, or a discussion forum and may simultaneously behave like one or more of these for different sets of people. In addition, unlike typical solutions that create multiple copies of content in order to implement cross-posting of content to multiple entities, system 100 stores a single copy of post 710 using a single code base and data schema and then applies one or more policies 910 in order to make post 710 available to more than one entity. As a result, posts 710 may be cross-posted to more than one entity with minimal data storage requirements.

Figure 10:
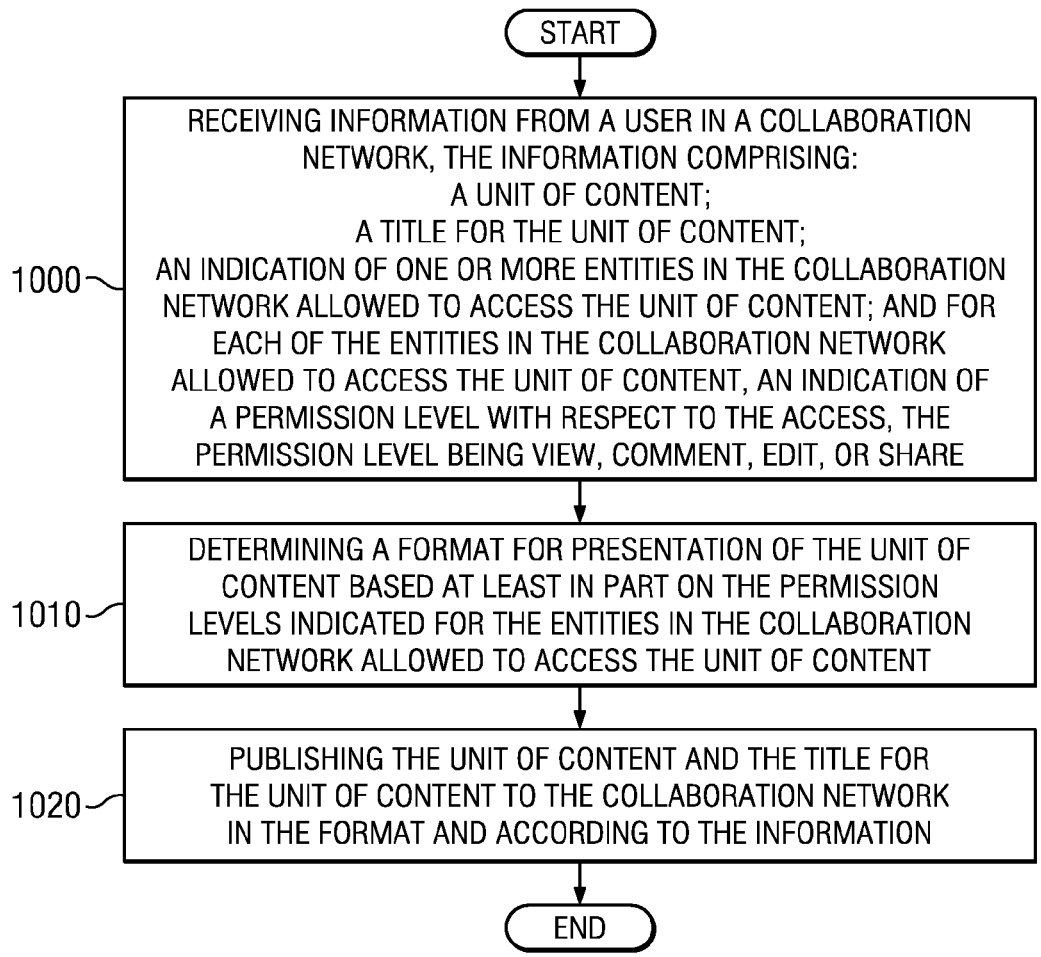
FIG. 10 illustrates an example method for generating content for social collaboration within an organization.

FIG. 10 illustrates an example method for generating content such as post 710 for social collaboration within an organization. The method may start at step 1000, where information from a user in a collaboration network is received. In certain embodiments, the information includes a unit of content, a title for the unit of content, an indication of one or more other users in the collaboration network allowed to access the unit of content, and an indication of a permission level with respect to the access, the permission level being view, comment, edit, or share for each of the other users in the collaboration network allowed to access the unit of content. In certain embodiments, the unit of content of step 1000 is content from content input area 820. In certain embodiments, the title of step 1000 is a title from title input area 810. In certain embodiments, the indication of one or more other entities in the collaboration network allowed to access the unit of content of step 1000 is destination 920. In certain embodiments, the indication of a permission level with respect to the access of step 1000 is an attribute 930.

At step 1010, a format for presentation of the unit of content of step 1000 is determined based at least in part on the permission levels indicated for the other users in the collaboration network allowed to access the unit of content. For example, if the unit of content has permission levels that allow a community to edit the content, it may be determined that the format of the unit of content should be a wiki page. As another example, if the unit of content has permission levels that allow everyone to view and comments on the content, it may be determined that the format of the unit of content should be a blog. In certain embodiments, the determined format may be a wiki, a blog, or a discussion forum.

At step 1020, the unit of content and the title for the unit of content is published to the collaboration network in the format determined in step 1010 and according to the information received in step 1000. For example, if the format for the unit of content is determined in step 1010 to be a blog, the unit of content and the title is published as a blog.

Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates particular components carrying out particular steps of the method of FIG. 10, this disclosure contemplates any suitable combination of any suitable components carrying out any suitable steps of the method of FIG. 10.

Figure 11:
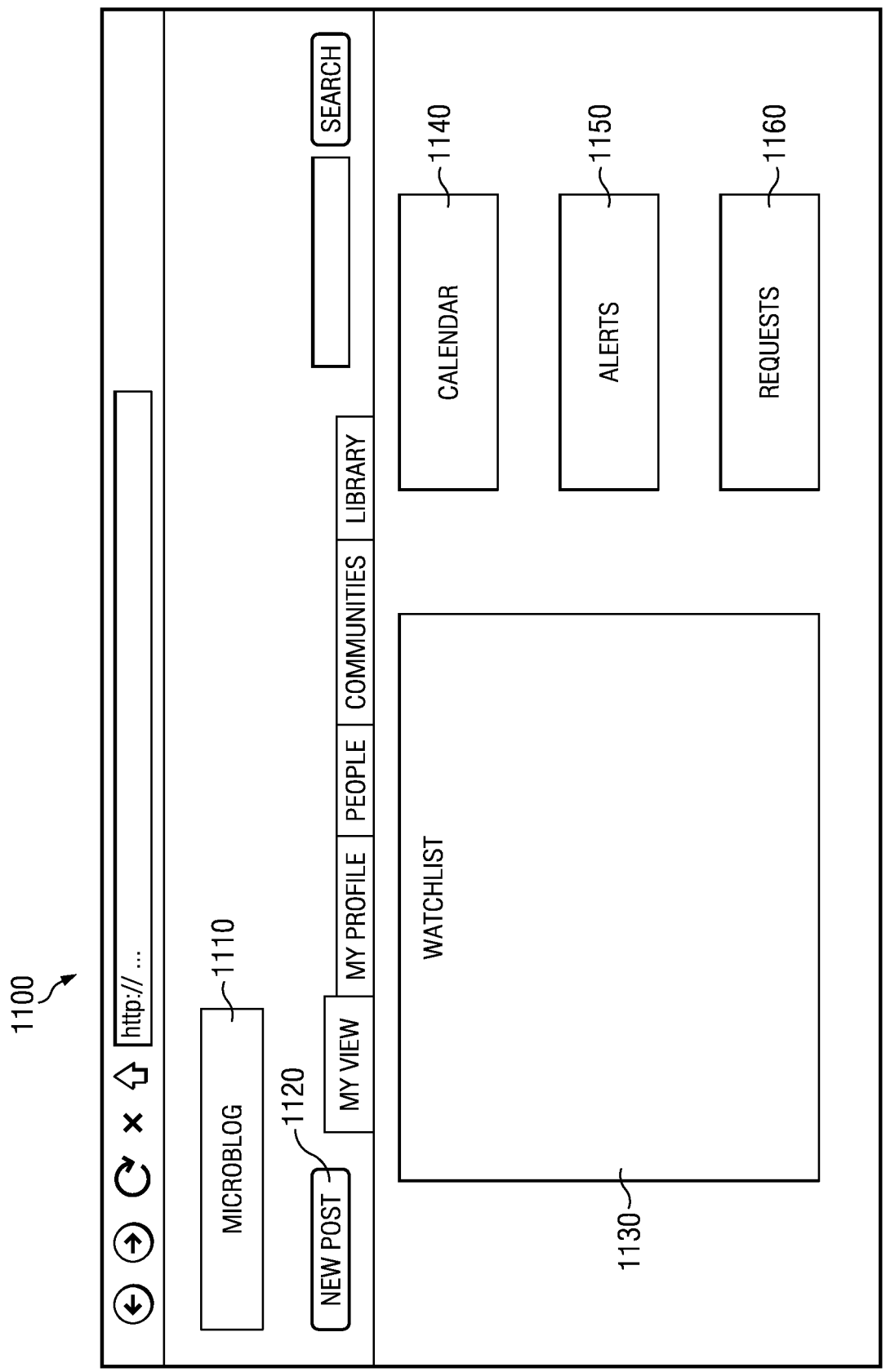
FIG. 11 illustrates an example GUI for social collaboration within an organization.

As discussed above, users of system 100 may utilize GUI 145 on clients 130 to communicate and collaborate with other users of system 100 in an enterprise environment. For example, FIG. 11 illustrates an example GUI for social collaboration within an organization. FIG. 11 illustrates one embodiment of a webpage 1100 that may be displayed in any appropriate internet browser, including, but not limited to, Microsoft Internet Explorer, Mozilla Firefox, Google Chrome, Apple Safari, Opera, a browser of a smartphone, or any other appropriate browser. Webpage 1100 may provide a social collaboration and communications tool to users of clients 130 according to teaching of the disclosure.

"Web 2.0" and existing social media applications are typically used to produce, share, and consume content. Users may post content using wikis, blogs, discussion forums, and other similar mechanisms. In one example, social media applications such as Facebook and Myspace allow users to publish content for consumption by friends and contacts of the user. However, current social media applications have several limitations, especially in the enterprise social networking context. As an example, the organization of the data in existing social media applications is often static and does not reflect the dynamic nature of the users' needs. As another example, users are typically overwhelmed with information crowding and clutter even though the only content that is explicitly shared with the user is presented. This is due to the fact that there is a dramatic amount of information flowing to the user from a variety of sources such as friends, professional contacts, communities and other mechanisms. As a result of this large amount of presented data, users of typical social media applications may get easily distracted and may find it hard to discern what information is important and needs attention.

To address these and other problems associated with existing social media applications in an enterprise social networking context, webpage 1100 includes various components that identify, organize, and dynamically update information presented to a user based on actions, activities, or events that occur in the system. In certain embodiments, webpage 1100 includes a microblog 1110, a post icon 1120, and various widgets 1130-1160. Microblog 1110 is a portlet/gadget that allows the user to easily author and publish a microblog. Embodiments of microblog 1110 are described below in reference to FIGS. 14-16. Post icon 1120 refers to an icon or button within webpage 1110 that when selected, provides the user with an interface to author and publish posts 710, as described above. For example, webpage 800 may be presented to the user in some embodiments when post button 1120 is selected.

Widgets 1130-1160 may refer to any widget/gadget enabled by computer program 150. In certain embodiments, the user may be able to browse and select numerous gadgets/portlets from a list of gadgets/portlets in which to add to webpage 1100. For example, in the illustrated embodiment of webpage 1100 of FIG. 11, the user has been presented with a watchlist widget 1130, a calendar widget 1140, an alert widget 1150, and a requests widget 1160. Watchlist widget 1130 refers to a widget/gadget that organizes and prominently displays a variety of content that is relevant to the user. Particular embodiments of watchlist widget 1130 are described below in reference to FIGS. 12-13. Calendar widget 1140 refers to a widget/gadget that displays the user's calendar. Alerts widget 1150 refers to a widget/gadget that displays various alerts to the user. Requests widget 1160 refers to a widget/gadget that allows the user to manage various requests from other users of system 100.

While FIG. 11 illustrates a particular arrangement of microblog 1110, post icon 1120, and widgets 1130-1160, other embodiments of webpage 1100 may have any appropriate arrangement, selection, and design of microblog 1110, post icon 1120, and widgets 1130-1160. For example, widgets 1130-1160 may include other widgets/gadgets and may be dragged and dropped by the user to various locations within webpage 1100.

Figure 12:
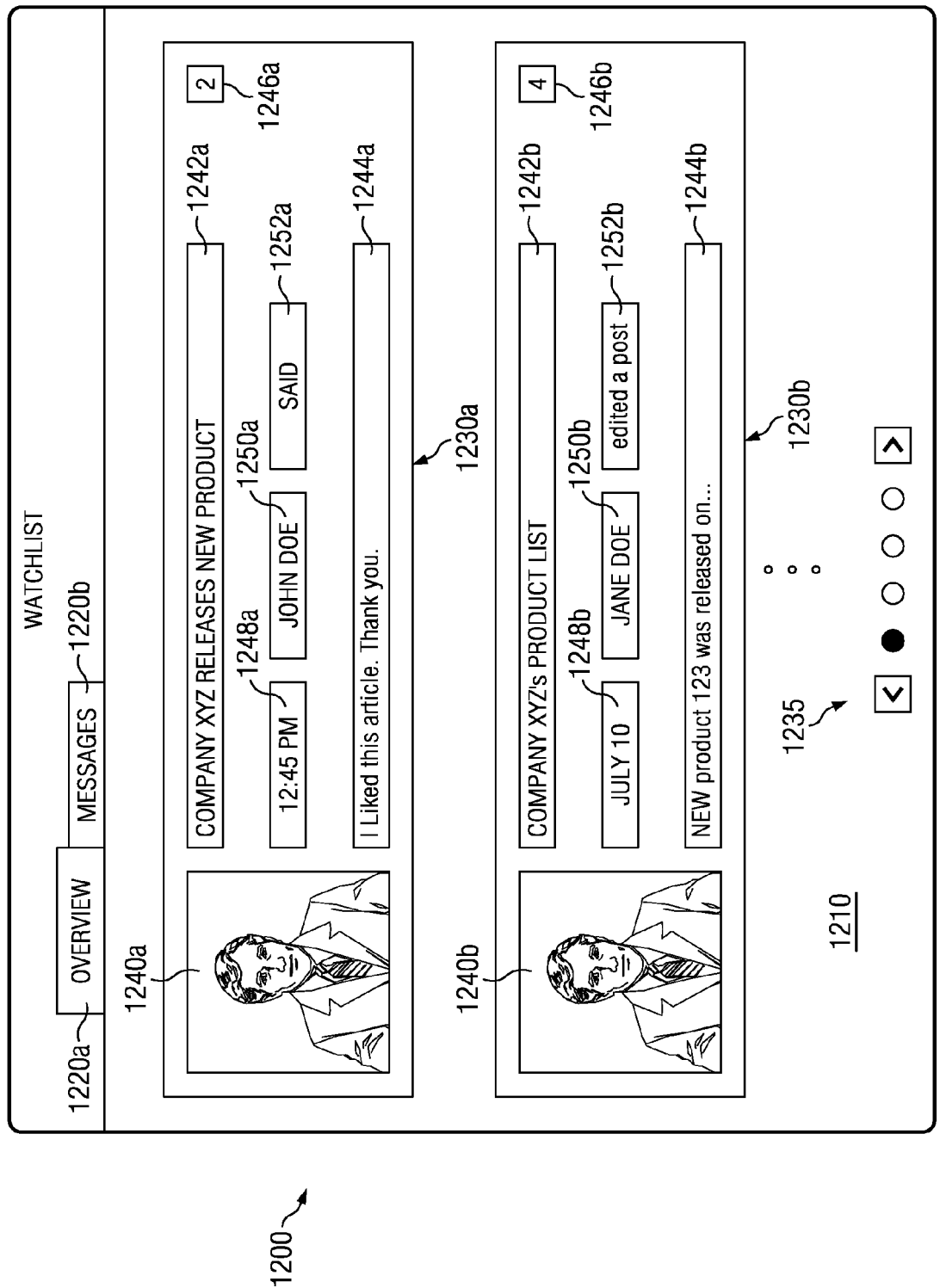
FIG. 12 illustrates an example watchlist for social collaboration within an organization.

FIG. 12 illustrates an example watchlist 1200 for social collaboration within an organization. In certain embodiments, watchlist 1200 may be watchlist widget 1130 in FIG. 11. Watchlist 1200 allows a user to easily identify, organize, and access content shared from a variety of sources. Traditionally, content that is shared with a user by another user such as a friend continues to accumulate in the user's library or repository. In the context of enterprises, this content could be content that is either shared by the user's contacts, content that is shared with communities in which the user is a member, and the like. In some cases, only a small subset of the content is relevant to the user's interest or is related to content that the user wishes to follow for additional updates. As the amount of content in that user's library increases over time, it becomes difficult for the user to find this subset of relevant content. Furthermore, this subset of relevant content is typically not displayed in a way that is noticeable or useful to the user. Consequently, a user is not able to easily track certain content or the number of times the content was updated since the last time they viewed it.

To address these and other problems associated with existing systems, certain embodiments of watchlist 1200 quickly organize and "bubble up" a variety of content that is relevant to the user. In certain embodiments, watchlist 1200 stays constantly updated through mechanisms such as asynchronous notifications for new incoming information that may be relevant to the user. In certain embodiments, watchlist 1200 reorganizes itself to display context-sensitive information in response to new events that happen within the overall system, such as an incoming call or IM from another person or a notification arriving either internally or externally through Open APIs. In some embodiments, watchlist 1200 may be prominently displayed on webpage 1100 in order to allow a user to easily and quickly locate the content that is relevant to the user.

In some embodiments, watchlist 1200 includes a main display area 1210, two or more tabs 1220, watched items 1230, and a navigation bar 1235. While watchlist 1200 illustrates a particular arrangement of tabs 1220, watched items 1230, and navigation bar 1240, other embodiments may have any appropriate arrangement and design of tabs 1220, watched items 1230, and navigation bar 1240.

Watchlist 1200 displays watched items 1230 that are relevant to the user based on certain criteria. In general, watched items 1230 begin appearing in watchlist 1200 if either the user interacts with a post 710 or another entity within system 100, or when another user within system 100 directly addresses an object such as a post 710 to the user. For example, watched item 1230 may appear in a user's watchlist 1200 when another user directly and explicitly shares content such as post 710 with the user, when the user creates a post 710, when the user comments or edits a post 710 and then other users comment on or edit that particular post 710, when the user chooses to follow or "favorite" another user and then that user performs some action such as editing or commenting on a post 710 or publishing a blog, when the user chooses to follow or "favorite" a post 710, when a post 710 is created that has a specific tag that is relevant to the user, or when system 100 determines that a specific number of other users within a certain social distance of the user are watching a post 710, other user, or community. In certain embodiments, any change or update to a particular watched item 1230 will automatically cause watchlist 1200 to track the change and move the particular watched item 1230 to the top of main display area 1210 (i.e., "bubble up"), thereby providing the user with a consistently updated list of content that is relevant to his interests.

In some embodiments, watched items 1230 may include an author badge 1240, a title 1242, a content summary 1244, a numeric badge 1246, a time indication 1248, an author indication 1250, and an action indication 1252. In certain embodiments, author badge 1240 may be an image, a video, or any other visual indication of the author or editor of watched item 1230. For example and for illustrative purposes only, watched item 1230*a* may be in response to a message sent to the user from user John Doe. In this example, author badge 1240 may be an image or video of John Doe that was selected by John Doe to represent himself. As another example, watched item 1230*b* may be in response to a watched post being edited by user Jane Doe. In this example, author badge 1240 may be an image or video of Jane Doe that was selected by Jane Doe to represent herself.

In certain embodiments, title 1242 may be a title of the content of watched item 1230. In some embodiments, title 1242 may also include a hyperlink to the content associated with watched item 1230. For example, title 1242*b* may be the title of a post 710 that watched item 1230*b* is associated with. In this example, post 710 associated with watched item 1230*b* has a title of "Company XYZ's Product List." Therefore, title 1242*b* is "Company XYZ's Product List" and may be a link to post 710 associated with watched item 1230*b*.

In certain embodiments, content summary 1244 may be a brief summary of the content associated with watched item

1230*b*. For example, content summary 1244*b* may be a summary of post 710 associated with watched item 1230*b*. In some embodiments, the content displayed in content summary 1244 may be the first few lines of the content associated with watched item 1230*b*. In some embodiments, content summary 1244 may include a thumbnail of a video or image, a summary of a linked page, or an icon that represents the document type.

In some embodiments, numeric badge 1246 indicates the number of updates that have occurred to the content associated with watched item 1230 since the last time the user viewed that content. As a result, the user is provided an indication of how active the content has been. For example, numeric badge 1246*a* may be "2" to indicate that the content associated with watched item 1230*a* has been updated twice since the last time the user viewed the content associated with watched item 1230*a*. In some embodiments, the updates to associated content may include a new comment by a user, a new edit to post 710, the content being "favorited" or shared by another user, and the like.

In certain embodiments, time indication 1248 may indicate the time that the content associated with watched item 1230 was authored or edited, author indication 1250 may indicate the name of the author or editor, and action indication 1252 may indicate the type of action that was performed by the author or editor. For example, watched item 1230*a* may include time indication 1248*a* of "12:45 PM," author indication 1250*a* of "John Doe," and action indication 1252*a* of "said" to indicate to the user that John Doe sent the comment to the user at 12:45 PM. Likewise, watched item 1230*b* may include time indication 1248*b* of "July 10," author indication 1250*b* of "Jane Doe," and action indication 1252*b* of "edited a post" to indicate to the user that Jane Doe edited post 710 associated with watched item 1230*b* on July 10.

In some embodiments, watchlist 1200 will automatically update without intervention from the user. For example, certain embodiments will automatically update without requiring a page refresh from the user when a watched user performs a qualified action. In some embodiments, this may be achieved by having asynchronous notifications being sent by a server through notification mechanisms such as XMPP and the like. As a result, watchlist 1200 stays updated with new content even if the user has not refreshed the browser.

In some embodiments, watchlist 1200 may dynamically reorganize watched items 1230 and display context sensitive content based on other internal or external, scheduled or unscheduled notifications or events in the system. In one embodiment, for example, watchlist 1200 may automatically reorganize watched items 1230 based on upcoming meetings in the user's calendar in order to display content that is relevant to the scheduled meeting. In another example, if the user receives an incoming call, chat request, email, or the like from another user, watchlist 1200 may reorganize watched items 1230 in order to display at the top of main display area 1210 any watched items 1230 that are associated with the user who is calling. In some embodiments, watchlist 1200 may automatically display at the top of main display area 1210 any watched items 1230 that were shared or last edited by the user who is calling, requesting a chat, emailing, or the like. In some embodiments, watchlist 1200 may order watched items 1230 based on the order in which they were received or updated. In certain embodiments, the most recent watched item 1230 is shown at the top of main display area 1210.

In some embodiments, events that cause watchlist 1200 to dynamically reorganize watched items 1230 may be received through Open APIs by external entities and systems. For example, external notifications may be received from another application such as a procurement application and the like. In this example, the received external notification may be a purchase requisition from one of the user's employees. Based on this received external notification, watchlist 1200 may reorganize watched items 1230 in order to display particular watched items 1230 that might be relevant to the item being purchased or content that the purchaser has authored or edited.

In some embodiments, two or more tabs 1220 may be included in watchlist 1200. In one embodiment, for example, tab 1220*a* may be an "Overview" tab and tab 1220*b* may be a "Messages" tab. In this embodiment, overview tab 1220*a*, when selected, may display all watched items 1230, regardless of content. Messages tab 1220*b*, when selected, may display only watched items 1230 related to messages specifically shared with the user. While two tabs 1220*a* and 1220*b* have been illustrated in FIG. 12, it should be noted that any number and combination of tabs 1220 may be utilized in watchlist 1200 to filter and control the display of watched items 1230.

In some embodiments, navigation bar 1235 may be included to control the display of watched items 1230. In some embodiments, for example, navigation bar 1235 may include forward and back arrows to allow the user to page forward and backward through watched items 1230. In some embodiments, navigation bar 1235 may include an indication of the total number of pages of watched items 1230 and the current page being viewed. In the illustrated embodiment, for example, the total number of pages of watched items 1230 is indicated by four unfilled circles and the current page being viewed is indicated by a filled circle. In some embodiments, navigation may be facilitated through a vertical scroll bar (not shown) on the right side of main display area 1210. In these embodiments, the user may scroll down to reveal more watched items 1230. Although a fixed number (e.g., 20) of watched items 1230 may be initially loaded, upon reaching the last watched item 1230 (e.g., the $20^{th}$ watched item 1230), an additional number of watched items 1230 (e.g., another 20) will be automatically loaded. In some embodiments, the user may request to load an additional number of watched items 1230 by clicking on a "Show more" link (not illustrated).

In some embodiments, watchlist 1200 may be directed to a particular community instead of a particular user. For example, watchlist 1200 may be configured to display content that is being watched by all the members of the community. In these embodiments, watched items 1230 for each member of the community are aggregated and then displayed and updated in watchlist 1220 as described above.

In certain embodiments, watchlist 1200 may include a searching function that allows a user to search and locate watched items 1230. In certain embodiments, for example, a user may search for watched items 1230 related to a specific entity such as another user or community. In another example, a user may search for watched items 1230 having a specific topic or title. In another example, a user may search for watched items 1230 using one or more key words.

Watchlist 1200 thus provides numerous advantages over traditional social media applications. For example, a user is not required to search through a voluminous amount of data in order to locate content that is relevant to the user or that requires the user's attention. Instead, content that is explicitly shared or followed, as well as content that is determined to be relevant, is made readily available to the user. The content is placed in a prominent location on webpage 1100, thus providing quick access to content that is relevant or that is being actively followed. In addition, the number of updates that have occurred to the content since it was last viewed by the user may be displayed, thus providing an indication of how active that content is based on updates or comments from other users. Furthermore, watchlist 1200 may automatically reorganize watched items 1230 based on received events or notifications in order to prominently display content that is sensitive to the received event or notification. In some embodiments, watchlist 1200 updates and reorganizes watched items 1230 without requiring a page refresh from the user.

Figure 13:
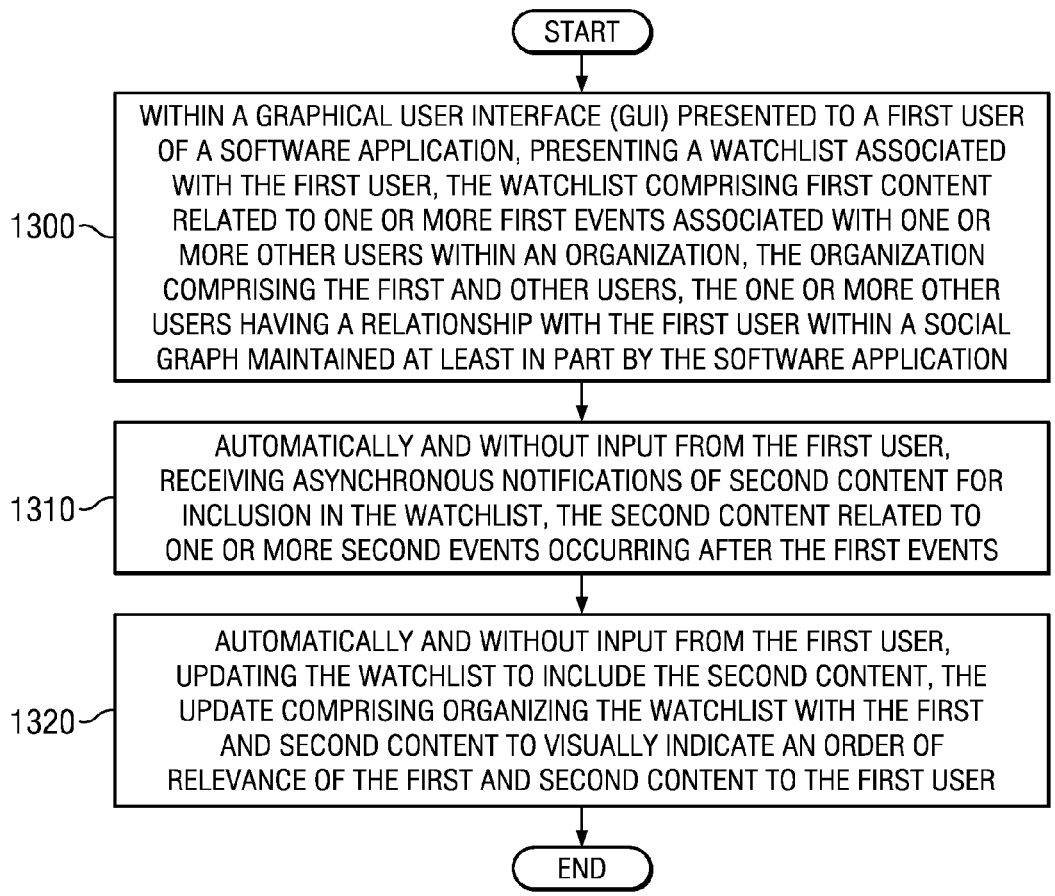
FIG. 13 illustrates an example method for generating the watchlist of FIG. 12.

FIG. 13 illustrates an example method for generating a watchlist such as watchlist 1200. The method may start at step 1300, where a watchlist associated with the first user is presented to a first user of a software application within a GUI. In certain embodiments, the watchlist includes first content related to one or more first events associated with one or more other users within an organization. For example, the first content may refer to watched items 1230 that are related to actions by other users within the organization such as the editing of a post 710, commenting on a post 710, and the like. In certain embodiments, the organization includes the first and other users. In certain embodiments, the one or more other users have a relationship with the first user within a social graph maintained at least in part by the software application. In certain embodiments, the relationship is proximate. In certain embodiments, the relationship is within a predetermined social distance. In certain embodiments, the social graph is social graph 400. In certain embodiments, the software application is computer program 150.

At step 1310, asynchronous notifications of second content for inclusion in the watchlist are received. In certain embodiments, the asynchronous notifications of second content are received automatically and without input from the first user. In certain embodiments, this may refer to the receiving the asynchronous notifications of second content without the first user refreshing a web browser. In certain embodiments, the second content is related to one or more second events occurring after the first events. In certain embodiments, each of the first and second content are a post by one of the one or more other users, a message from one of the one or more other users, or an activity by one of the one or more other users.

At step 1320, the watchlist is updated to include the second content. In certain embodiments, the updating occurs automatically and without input from the first user. In certain embodiments, the update includes organizing the watchlist with the first and second content to visually indicate an order of relevance of the first and second content to the first user. In certain embodiments, the watchlist is organized with the most recent content appearing at the top of the watchlist.

Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates particular components carrying out particular steps of the method of FIG. 13, this disclosure contemplates any suitable combination of any suitable components carrying out any suitable steps of the method of FIG. 13.

Figure 14:
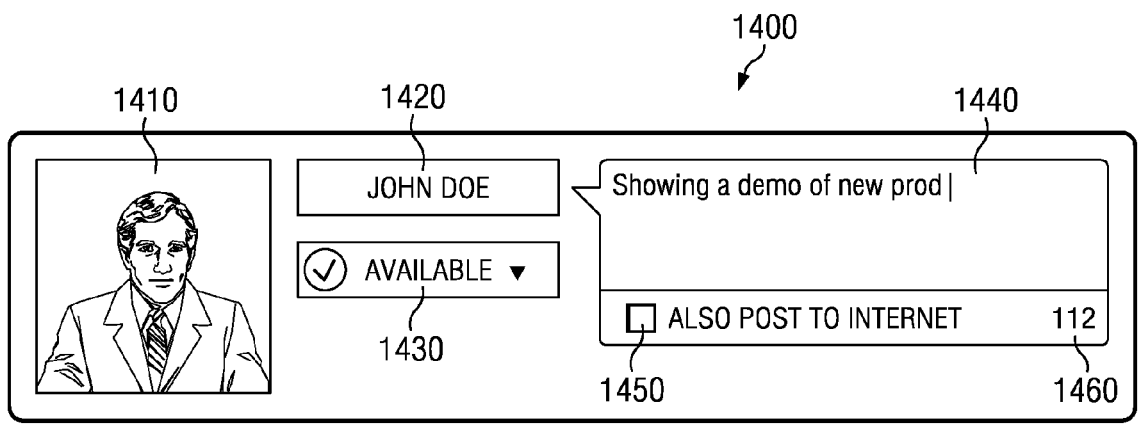
FIG. 14 illustrates an example microblog for social collaboration within an organization.

FIG. 14 illustrates an example microblog 1400 for social collaboration within an organization. In certain embodiments, microblog 1400 may be microblog 1110 of FIG. 11. In general, microblog 1400 allows a user to easily share short messages (i.e., "microblogs") with others users in an enterprise environment, as described below. Unlike typical microblogging tools, microblogs created in microblog 1400 are generally not viewable by people outside the organization unless specifically allowed by the user. In addition, some embodiments of microblog 1400 may also provide an intelligent and flexible way to restrict access to microblogs being shared.

In some embodiments, microblog 1400 includes a user badge 1410, a user name 1420, a status indicator 1430, a microblog message area 1440, a control box 1450, and a character indicator 1460. While FIG. 14 illustrates a particular arrangement of user badge 1410, user name 1420, status indicator 1430, microblog message area 1440, control box 1450, and character indicator 1460, other embodiments of microblog 1400 may have any appropriate arrangement and design of user badge 1410, user name 1420, status indicator 1430, microblog message area 1440, control box 1450, and character indicator 1460.

In some embodiments, microblog 1400 includes user badge 1410 that may be an image, a video, or any other visual indication of the user who is creating a microblog. In some embodiments, user badge 1410 is similar to author badge 1240 discussed above in reference to FIG. 12. In some embodiments, microblog 1400 includes user name 1420 to indicate the name of the user creating a microblog. Microblog 1400 may additionally include status indicator 1430 that indicates the current status of the user. For example, status indicator 1430 may be "available" to indicate that the user is available for a chat, call, meeting, IM, and the like. In some embodiments, status indicator 1430 may additionally be clicked by the user in order to display a drop-down list of status indicators for the user to choose.

In some embodiments, microblog message area 1440 refers to a text-entry box that allows the user to input a microblog message. In some embodiments, the microblog message entered in message area 1440 may be limited to 140 characters. Microblog 1400 may additionally include character indicator 1460 that automatically updates as the user types in message area 1440 in order to indicate how many characters are remaining before a character limit is reached.

In some embodiments, microblog 1400 includes control box 1450 that allows the user to control whether the microblog message entered into message area 1440 is additionally posted external to the organization, such as to the internet. In some embodiments, control box 1450 allows the user to select to additionally post the microblog message entered into message area 1440 to services such as Twitter and the like.

Figure 15:
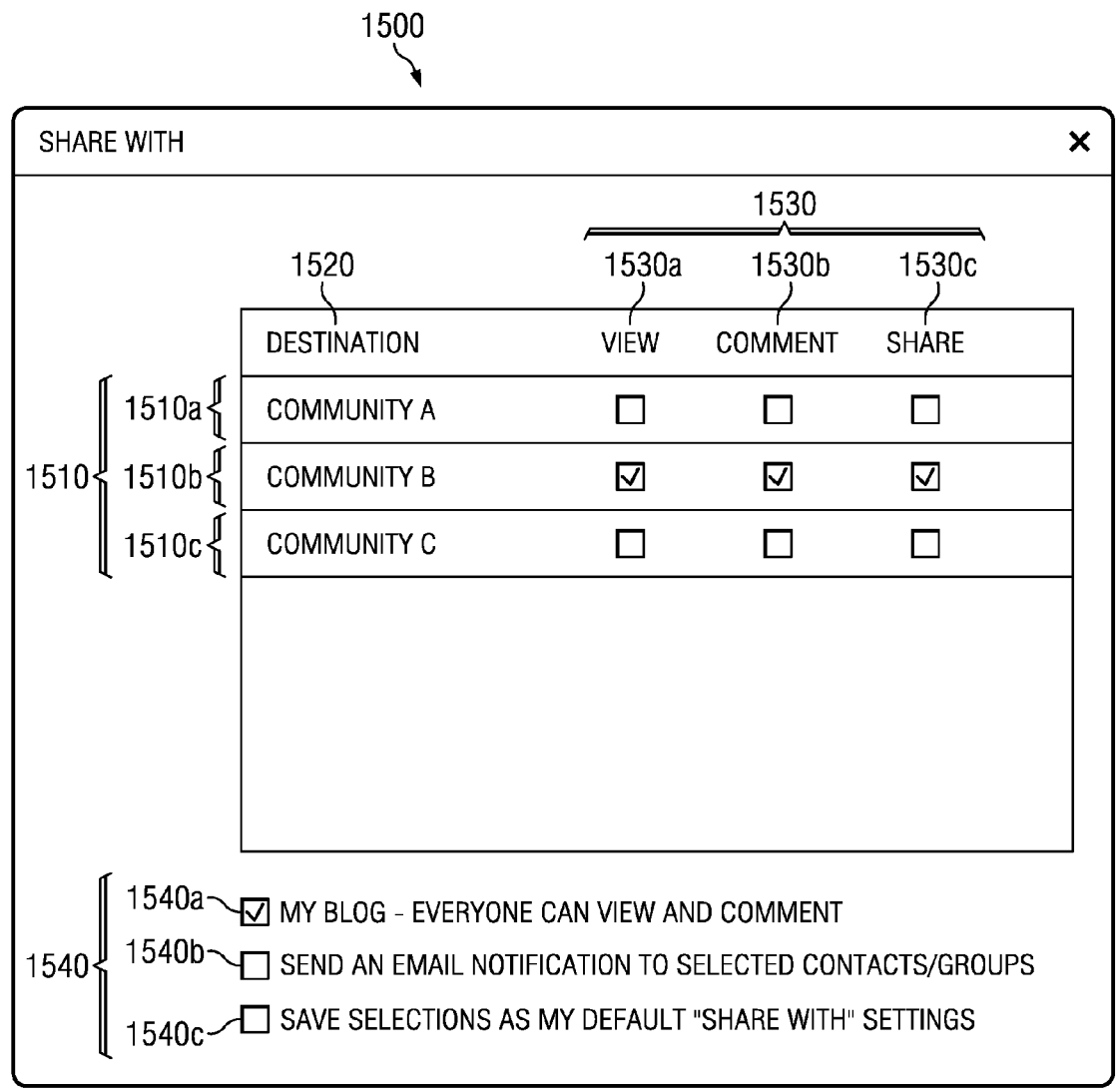
FIG. 15 illustrates an example GUI for controlling access to the microblog of FIG. 14.

In certain embodiments, microblog 1400 provides an intelligent and flexible way for the microblog's sender to restrict the scope of access to a given microblog prior to it being sent/posted. In some embodiments, the scope of access to a given microblog may be restricted by allowing the sender of a microblog to attach a Microblog Scoping Policy (MSP) to a microblog before it is sent/posted. FIG. 15 illustrates one example of an MSP interface 1500 that may be utilized to restrict the scope of access to a given microblog. MSP interface 1500 may be implemented as a pop-up on webpage 1500 and may include one or more policies 1510 and one or more options 1540. In some embodiments, MSP interface 1500 may appear on webpage 100 immediately before a microblog is posted and may automatically list entities such as other users and communities within the enterprise and access options for each entity.

In some embodiments, each policy 1510 may include a destination 1520 and one or more attributes 1530. Destination 1520 may refer to an entity within the enterprise that the particular policy 1510 is directed to. In some embodiments, for example, destination 1520 may be a community, a contact of the sender, or any other user within the enterprise that the sender has a connection to or social relationship with. Attributes 1530 may refer to various options that the sender of the microblog may select in order to control how the entity of destination 1520 will have access to the microblog. Example attributes 1530 may include a "view" attribute 1530a, a "comment" attribute 1530b, and a "share" attribute 1530c. In some embodiments, attributes 1530 may additionally include time/date options that allow the sender to control access to the microblog according to a specific date or time.

In certain embodiments, MSP interface 1500 may include one or more options 1540. For example, some embodiments may include a check-box option 1540a that the sender of the microblog may select in order to allow anyone within the enterprise to view and comment on the microblog. Some embodiments may include a check-box option 1540b that will enable the sending of an email notification to selected contacts/groups. Some embodiments may include a check-box option 1540c that will save the selected options/selections as default settings for future microblogs.

In operation, a user within an enterprise may initiate the sending/posting of a microblog by first typing a short microblog message into microblog message area 1440. In some embodiments, a user may optionally select via control box 1450 whether to post the microblog outside the enterprise such as to the internet, as described above. While typing in microblog message area 1440, the user may be given a visual indication via character indicator 1460 of the amount of the amount of characters remaining before a character limit is reached.

After the user has composed a microblog message in microblog message area 1440 but before the microblog message is sent/posted, the user may be presented with or may optionally reveal MSP interface 1500 that may be utilized to create an MSP that will restrict the scope of access to the microblog. The illustrated MSP interface 1500 includes one or more policies 1510 that allow the user to tailor the access privileges for various entities within the enterprise. As an example for illustrative purposes only, the user may be presented with MSP interface 1500 as illustrated in FIG. 15. MSP interface 1500 includes three policies 1510—policy 1510a which is directed to a destination of "Community A" within the enterprise, policy 1510b which is directed to a destination of "Community B" within the enterprise, and policy 1510c which is directed to a destination of "Community C" within the enterprise. In some embodiments, MSP interface 1500 automatically populates available destinations 1520 according to connections to the user using social graph 400 described above in reference to FIG. 4. For example, MSP interface 1500 may allow a user to post a microblog to everyone who is a friend of his, everyone who is a friend of a friend, or people within certain communities that have certain expertise or interest according to their social graph.

After being presented with MSP interface 1500, the sender of the microblog may select attributes 1530 in order to control how particular destinations 1520 will have access to the microblog. For example, the sender may decide to only allow Community B access to the microblog. Furthermore, the sender may decide that Community B should be able to share the microblog. Accordingly, the sender may select "view" attribute 1530a, "comment" attribute 1530b, and "share" attribute 1530c, as illustrated in policy 1510b. In another example, the sender may decide that anyone may access the microblog. Accordingly, the user may select check-box option 1540a, as illustrated in FIG. 15.

After the sender makes the desired selections regarding who and how the microblog may be accessed, a corresponding MSP may generated and transported along with the microblog to computer system 120 for processing. Once computer system 120 receives the MSP, it may be enforced by a policy engine, as described below in reference to FIG. 20. Computer system 120 may consult the policy engine first and get clearance for a given user, community, or contact before it will allow access to a particular microblog, according to that microblog's associated MSP.

In some embodiments, computer system 120 may selectively allow microblogs posted within an enterprise to also go outside the enterprise and be viewable by the general public on networks such as the internet. In some embodiments, for example, that status of control box 1550 may be utilized by computer system 120 to control whether a microblog will pass through a gateway that ensures that one or more criteria is met before allowing the microblog to be transmitted external to the enterprise. For example, system administrators or users may define criteria or policies that get enforced by a policy engine as described below in reference to FIG. 20. An example policy may include a policy to ensure that a microblog does not contain any prohibited language before it goes outside the enterprise. Another example policy may be a policy that ensures that no financial information is being shared immediately before a company's quarterly earnings announcement.

In some embodiments, MSPs may be shared between users so that a user does not have to recreate MSPs that have already been created by someone else. For example, a user may select to utilize an MSP that was previously created by a system administrator, a friend, a particular community, or any other entity within the enterprise. In some embodiments, MSP interface 1500 may present a list of shared or save MSPs that are available to the sender.

As a result, a sender of a microblog can define a very simple MSP, or may create a sophisticated MSP wherein different entities have different access options. For example, a sender may create a simple MSP that limits access to members of a particular social community, or the sender can create a more sophisticated MSP such as an MSP that allows access to members of Communities A and B who have been members of those communities before a specific date and who are friends of a specific user in Community C. In general, MSPs may range from being trivially simple and easy to use to all the way being very sophisticated and powerful with all the capability and flexibility provided by a script or a programming language.

In some embodiments, a microblog message created with microblog 1400 may be stored as a post 710. For example, text entered into microblog message area 1440 may be mapped to the content of a post 710 as if it were entered using content input area 820. In some embodiments, the sharing options of post 710 such as policies 910 may be automatically mapped according to appropriate sharing settings of a microblog. In some embodiments, if an item such as a video, image, or document is shared in a microblog message, such items may be mapped to the attachments or links of a post 710 as would typically be accomplished using add link icon 840 or upload file icon 850 as described above. In some embodiments, titles of microblog messages may be inferred from filenames of attached items such as a video, image, or document.

Figure 16:
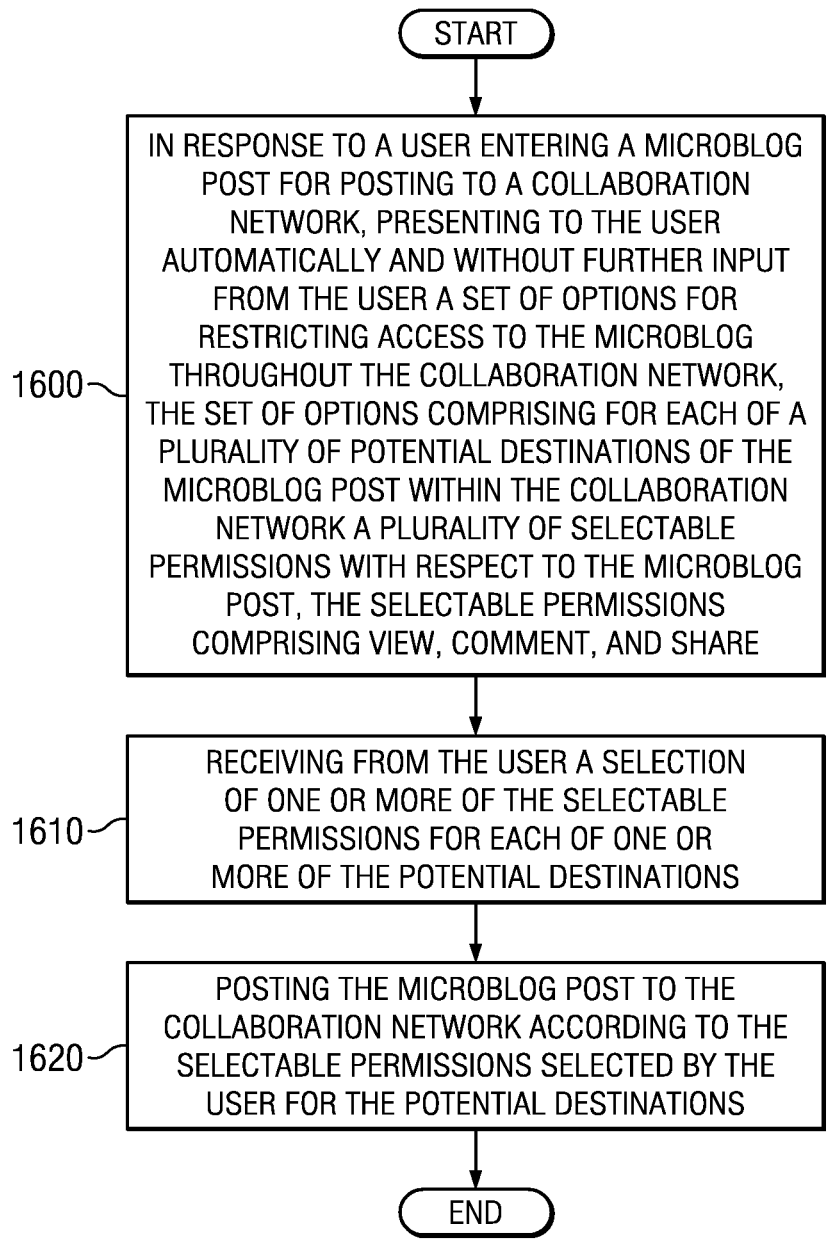
FIG. 16 illustrates an example method for generating the microblog of FIG. 14.

FIG. 16 illustrates an example method for generating a microblog. In certain embodiments, the microblog is microblog 1400 of FIG. 14. The method may start at step 1600, where, in response to a user entering a microblog post for posting to a collaboration network, the user is presented a set of options for restricting access to the microblog throughout the collaboration network. In certain embodiments, the set of options for restricting access to the microblog is presented to the user automatically and without further input from the user.

In certain embodiments, the set of options include a plurality of selectable permissions with respect to the microblog post for each of a plurality of potential destinations of the microblog post within the collaboration network. In certain embodiments, the set of options is MSP interface 1500. In certain embodiments, the plurality of selectable permissions refers to attributes 1530 and include view, comment, and share. In certain embodiments, the plurality of potential destinations refers to destinations 1520. In certain embodiments, the plurality of potential destinations include a community of users and a second user having a relationship with the user.

At step 1610, a selection of one or more of the selectable permissions for each of one or more of the potential destinations is received from the user. In certain embodiments, the user may utilize a client 130 in order to transmit the selection of one or more of the selectable permissions to computer system 120 and computer program 150.

At step 1620, the microblog post is posted to the collaboration network according to the selectable permissions selected by the user for the potential destinations. For example, if the user selected an option to allow everyone to view and comment on the microblog, the microblog may appear to everyone with a connection to the user according to social graph 400. As another example, if the user selected permissions to only allow a particular community to view the microblog, the microblog may appear to all members of the particular community. In certain embodiments, the microblog post may additionally be posted to a network outside of the collaboration network based on an indication from the user.

Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates particular components carrying out particular steps of the method of FIG. 16, this disclosure contemplates any suitable combination of any suitable components carrying out any suitable steps of the method of FIG. 16.

Figure 17:
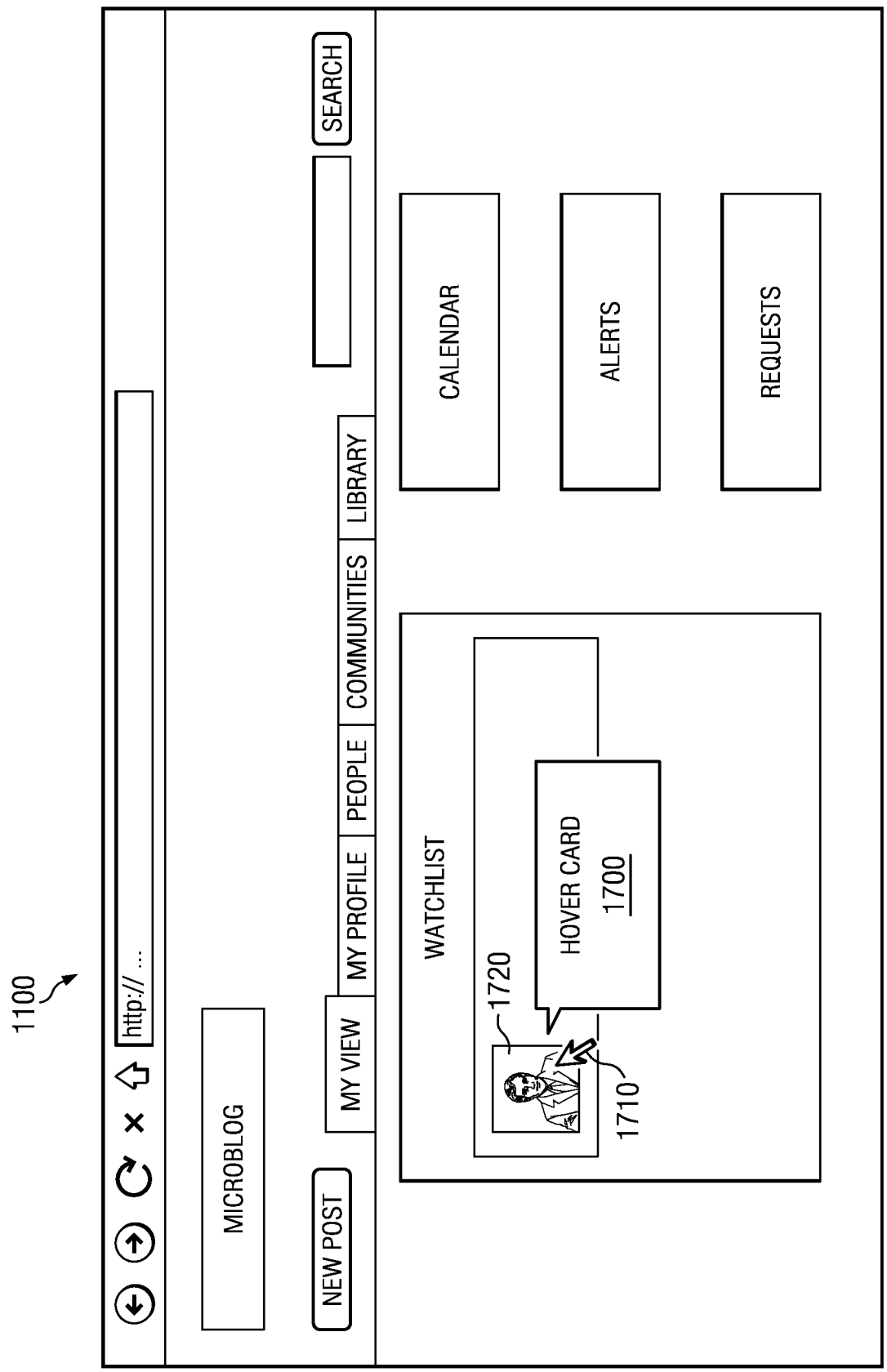
FIG. 17 illustrates another example GUI for social collaboration within an organization.

As discussed above, embodiments of webpage 1100 include tools to collaborate and interact with other users and communities within a user's social network. As such, webpage 1100 includes various links to other users and communities. For example, webpage 1100 may include numerous instances of links to other entities such as author badge 1240, author indication 1250, and the like. To provide a convenient way to further interact with another user or community that is represented by one of these links, certain embodiments of webpage 1100 include a contact hover card that may appear on webpage 1100 when a user hovers over a link to another entity. FIG. 17 illustrates one embodiment of webpage 1100 that may include a contact hover card 1700. In certain embodiments, contact hover card 1700 may appear on webpage 1100 proximate to a pointer 1710 when a user hovers pointer 1710 over another entity 1720 such as a link to or picture of another user or community within the enterprise.

Embodiments of contact hover card 1700 provide numerous advantages over existing systems. For example, while existing systems may provide directory information regarding another user, this information is typically static and unintelligent. Contact hover card 1700, however, provides near real-time information about the hovered-upon entity. In addition, Contact hover card 1700 provides a dynamic set of tools that allow the hovering user to interact and collaborate with the hovered-upon entity. In some embodiments, for example, these dynamic tools may include dynamically created icons that may be used for click-to-call, click-to-IM, click-to-meeting, and the like. Additionally, some embodiments of contact hover card 1700 may include dynamically generated information about the hovered-upon entity that is based on contextual information. In general, embodiments of contact hover card 1700 provide a dynamic and intelligent set of information that enables a rich and productive interaction between the hovering user and the hovered-upon entity. One embodiment of contact hover card 1700 is illustrated below in reference to FIG. 18.

Figure 18:
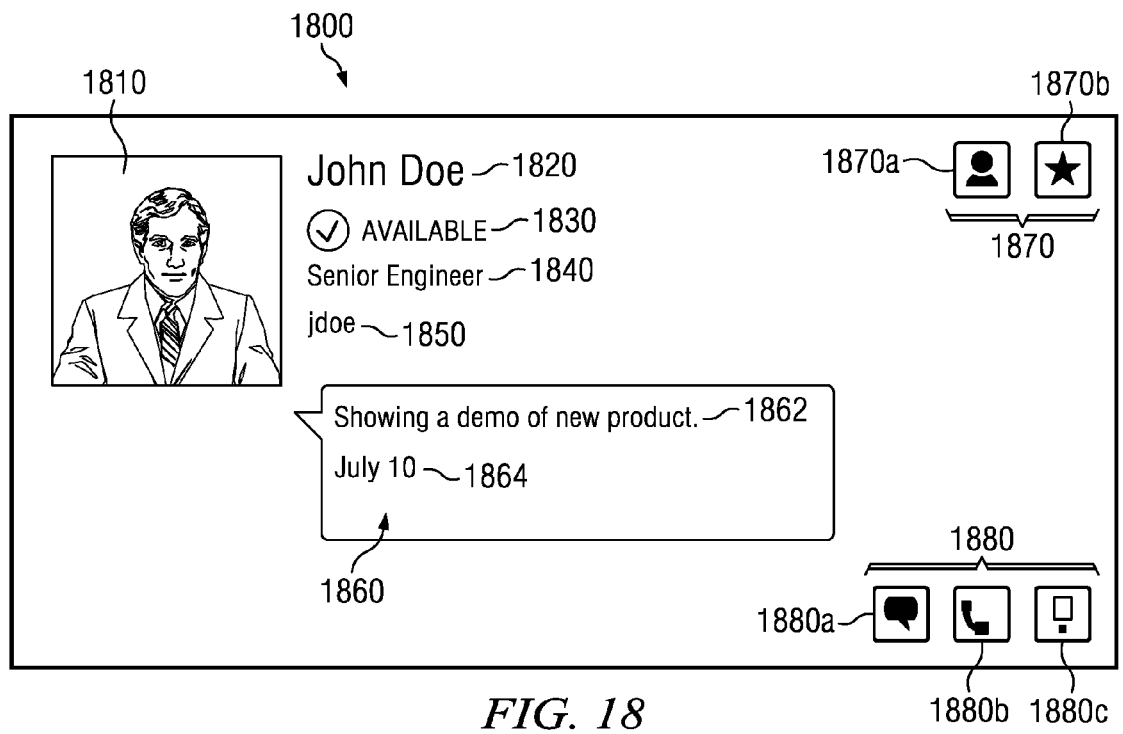
FIG. 18 illustrates an example contact hover card for social collaboration within an organization.

FIG. 18 illustrates an example contact hover card 1800 for social collaboration within an organization. In certain embodiments, contact hover card 1800 may be contact hover card 1700 of FIG. 17. In some embodiments, contact hover card 1800 includes an entity badge 1810, an entity name 1820, a status indicator 1830, a title 1840, an entity identification 1850, a microblog display 1860, one or more contact icons 1870, and one or more unified communications (UC) icons 1880. While FIG. 18 illustrates a particular arrangement of entity badge 1810, entity name 1820, status indicator 1830, title 1840, entity identification 1850, microblog display 1860, contact icons 1870, and UC icons 1880, other embodiments of contact hover card 1800 may have any appropriate arrangement and design of entity badge 1810, entity name 1820, status indicator 1830, title 1840, entity identification 1850, microblog display 1860, contact icons 1870, and UC icons 1880. In addition, certain embodiments of contact hover card 1800 may include only a selection of entity badge 1810, entity name 1820, status indicator 1830, title 1840, entity identification 1850, microblog display 1860, contact icons 1870, and UC icons 1880, or may include additionally elements not illustrated in FIG. 18.

In certain embodiments, entity badge 1810 may be an image, a video, or any other visual indication of entity 1720 that the user is hovering over with pointer 1710. In some embodiments, entity badge 1810 is similar to author badge 1240 discussed above in reference to FIG. 12. Entity name 1820 may be any indication of the name of entity 1720 that the user is hovering over with pointer 1710. In some embodiments, entity name 1820 may additionally be a hyperlink to additional information about entity 1720. Status indicator 1830 may be any indications of the current status of entity 1720. For example, status indicator 1830 may be "available" to indicate that entity 1720 is online or available for a chat, call, IM, meeting, and the like. Title 1840 may be any title of entity 1720. In certain embodiments, title 1840 may be a formal title of entity 1720 within the organization such as "Vice President", a label describing entity 1720's role within a community or group, or an alias of entity 1720 such as handle or pseudonym. In some embodiments, a user-defined title may also be shown in addition to or in place of a system-defined title. Entity identification 1850 may be an indication of an identification (ID) of entity 1820. For example, entity identification 1850 may be a user ID, system ID, community ID, or any other appropriate ID of entity 1720 used by computer system 120 to identify entity 1720.

In some embodiments, contact hover card 1800 includes microblog display 1860. Microblog display 1860 may display a recent microblog 1862 authored by entity 1720. For example, once a first user enters a microblog in microblog message area 1440 of webpage 1100, it may then appear in contact hover card 1800 in microblog display 1860 when a second user hovers pointer 1710 over entity 1720 corresponding to the first user. In some embodiments, microblog display 1860 may additionally indicate a date 1864 of when recent microblog 1862 was authored by entity 1720.

In some embodiments, contact hover card 1800 includes one or more contact icons 1870 that provide the user a convenient way to manage contact options for entity 1720. In some embodiments, for example, contact icons 1870 may include one or both of an add-to-contacts icon 1870*a* and a follow-contact icon 1870*b*. Add-to-contacts icon 1870*a* may refer to an icon that may be pressed in order to add entity 1820 to the user's contact list. This may allow, for example, the user to quickly locate contact information regarding entity 1820 in an address book, directory, and the like. Follow-contact icon 1870*b* may refer to an icon that may be pressed in order to "follow" an entity 1820. For example, if entity 1820 is another user, follow-contact icon 1870*b* may be pressed in order to "follow" that user and then see various activities from them. This may result, for example, in any new activity by the followed user appearing in the user's watchlist, such as watchlist 1200 described above.

In some embodiments, contact icons 1870 are dynamically created according to certain contextual information. For example, before add-to-contacts icon 1870*a* is presented in contact hover card 1800 to a user, computer system 120 may determine whether entity 1720 is already a contact of the user. If entity 1720 is already a contact of the user, add-to-contacts icon 1870*a* may be disabled by, for example, appearing grayed out. If, however, it is determined that entity 1720 is not already a contact of the user, add-to-contacts icon 1870*a* may be enabled and will function as described above. As another example, before follow-contact icon 1870*b* is presented in contact hover card 1800 to a hovering user, computer system 120 may determine whether entity 1720 has already been selected to be followed by the user. If entity 1720 has already been selected to be followed by the user, follow-contact icon 1870*b* may be disabled. If, however, it is determined that entity 1820 has not been selected to be followed by the user, follow-contact icon 1870*b* may be enabled and will function as described above.

In some embodiments, contact hover card 1800 includes one or more UC icons 1880 that may provide a richer and more productive interaction between the hovering and hovered upon users. In some embodiments, for example, UC icons 1880 may include one or more of a click-to-chat UC icon 1880*a*, a click-to-talk UC icon 1880*b*, and a click-to-meet UC icon 1880*c*. While FIG. 18 illustrates a particular arrangement of click-to-chat UC icon 1880*a*, click-to-talk UC icon 1880*b*, and click-to-meet UC icon 1880*c*, other embodiments of contact hover card 1800 may have any appropriate arrangement, design, and selection of click-to-chat UC icon 1880*a*, click-to-talk UC icon 1880*b*, and click-to-meet UC icon 1880*c*.

In certain embodiments, UC icons 1880 provide the hovering user the ability to establish one or more of a particular type of communication session with the hovered upon entity. For example, click-to-chat UC icon 1880*a* may be selected in order to attempt to initiate an instant messaging (IM) or chat session with entity 1720. As another example, click-to-talk UC icon 1880*b* may be selected in order to attempt to initiate a voice phone call with entity 1720. As another example, click-to-meet UC icon 1880*c* may be selected in order to attempt to initiate a meeting such as a WebEx session with entity 1720. In certain embodiments, UC icons 1880 may additionally/alternatively provide the hovering user the ability to establish other types of communication sessions such as click-to-video call, a click-to-video chat, a Short Message Service (SMS) text message, a paging session, and the like. In certain embodiments, contact hover card 1800 is open, allowing any back-end UC system from any vendor to drive the functionality of UC icons 1880. As a result, a user is provided with a convenient way to quickly and easily contact entity 1720 utilizing a variety of types of communications sessions simply by hovering pointer 1710 over entity 1720.

In some embodiments, UC icons 1880 are dynamically created according to certain contextual information. For example, before icons 1880*a*-1880*c* are presented in contact hover card 1800, computer system 120 may determine whether entity 1720 is currently online or available for a communications session. If entity 1720's status indicates that entity 1720 is offline or unavailable, icons 1880*a*-1880*c* may be disabled by, for example, appearing grayed out. If, however, it is determined that entity 1720 is online or available, icons 1880*a*-1880*c* may be enabled and will function as described above.

In certain embodiments, click-to-talk UC icon 1880*b* may be additionally/alternatively dynamically created according to certain contextual information such as preferences specified by entity 1720. For example, if entity 1720 is another user and that user has specified a preferred telephone phone number in which to be contacted, computer system 120 may retrieve the preferred telephone number and dynamically generate click-to-talk UC icon 1880*b* that operates when selected to attempt to place a call to entity 1720 using the preferred telephone number. In certain embodiments, click-to-talk UC icon 1880*b* may be additionally/alternatively dynamically generated to include a selectable drop-down list that is populated with all available telephone numbers for entity 1720. For example, computer system 120 may retrieve available telephone numbers for entity 1720 from entity 1720's preferences, an employee directory such as an LDAP directory, a data store such as collaboration data store 310, and the like.

In certain embodiments, click-to-meet UC icon 1880*c* may be additionally/alternatively dynamically created according to certain contextual information such as calendar data for the hovering user. For example, if the hovering user is currently in a WebEx session with another user, computer system 120 may retrieve information about the WebEx meeting and determine from the retrieved data the participants of the meeting. Computer system 120 may then generate click-to-meet UC icon 1880*c* based on the determination of the participants of the meeting. For example, if it is determined that entity 1720 is not currently participating in the meeting already in progress, click-to-meet UC icon 1880*c* may be generated to present to the hovering user, when selected, an option to invite or add entity 1720 to the meeting already in progress. As a result, a user may easily and quickly attempt to initiate a WebEx or similar meeting session with any entity 1720 in webpage 1100.

The contextual information utilized to generate content in contact hover card 1800 may be any information related to the hovering or hovered-upon user of webpage 1100. In certain embodiments, for example, clients 120 may transmit information including the hovering and hovered upon users and other contextual information to computer system 120 prior to the generation and display of contact hover card 1800. In certain embodiments, the transmitted contextual information may include the location of entity 1720 within webpage 1100, the physical location of both users, the time of day of the hovering, the availability of the hovered upon user, and the like. As an example, if user "John" is hovering over the name of another user "Jane" in webpage 1100 as he views a blog written by Jane, then client 130 may transmit to computer system 120 the names of John and Jane along with an indication that the hovering is occurring in a blog by Jane. Contact hover card 1800 could then be dynamically generated to include related content such as a link to additional related blogs generated by Jane, a link to additional blogs by other users on similar topic, a link to other blogs that have been tagged in similar way, and the like. As another example, contact hover card 1800 may include dynamically generated content related to the physical location of the hovered upon entity 1720. For example, computer system 120 may determine based on GPS data or IP location data that a hovered upon user is currently located in the main conference room. Contact hover card 1800 may then be dynamically generated to include text such as "Jane is currently in the main conference room" in order to indicate the current physical location of the hovered upon user. As a result, a user viewing webpage 1100 and contact hover card 1800 may be provided with a set of tools and information to enhance the interaction between the hovered upon entity.

In embodiments where entity 1720 is a community, contact hover card 1800 may be generated as described above. However, contact hover card 1800 may differ slightly from when entity 1720 is another user. For example, contact hover card 1800 for a community may include one or more of a community icon or picture for entity badge 1810, a community description, a status of the community, and one or more community tags. In addition, UC icons 1880 may behave differently if entity 1720 is a community rather than another user. For example, click-to-talk UC icon 1880*b* may attempt to initiate a telephone call to a community call distribution phone number that distributes the call to members of the community. As another example, click-to-talk UC icon 1880*b* may display, when selected, a list of the members of the community. In this example, the hovering user may can click upon any of the members in order to attempt to initiate a telephone call to that member. In certain embodiments, contact hover card 1800 for an entity 1720 that is a community may have additional community action buttons/icons. For example, one embodiment of contact hover card 1800 for an entity 1720 that is a community may include a button/icon that allows a user to join that community if the user is not a member of the community or leave that community if the user is already a member of the community. In certain embodiments, contact hover card 1800 for an entity 1720 that is a community may include a status of the hovering user in that community. For example, the status of the hovering user may be whether or not the user is a member of that community.

Figure 19:
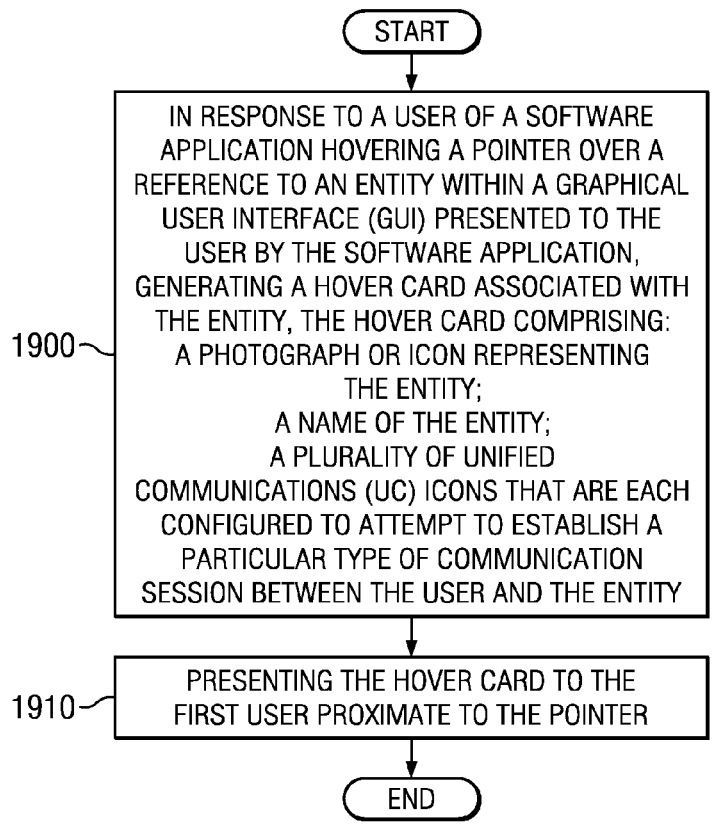
FIG. 19 illustrates an example method for generating the contact hover card of FIG. 18.

FIG. 19 illustrates an example method for generating a contact hover card. In certain embodiments, the contact hover card is contact hover card 1800 of FIG. 18. The method may start at step 1900, where, in response to a user of a software application hovering a pointer over a reference to an entity within a GUI presented to the user by the software application, a hover card associated with the entity is generated. In certain embodiments, the generated hover card includes a photograph or icon representing the entity, a name of the entity, and a plurality of UC icons that are each configured to attempt to establish a particular type of communication session between the user and the entity. In certain embodiments, the generated hover card may include only a subset of a photograph or icon representing the entity, a name of the entity, and a plurality of UC icons that are each configured to attempt to establish a particular type of communication session between the user and the entity, or may include any additional appropriate elements. In certain embodiments, the UC icons are dynamically generated as discussed above. In certain embodiments, the generated hover card includes contextual content associated with the entity that is based at least in part on contextual information associated with the GUI presented to the user when the user hovers the pointer over the reference to the entity. In certain embodiments, the contextual information includes a location within the GUI of the reference to the entity. In certain embodiments, the entity comprises a community of users within the organization. In certain embodiments, the entity comprises another user. In certain embodiments, the hover card includes a current physical location of the entity. In certain embodiments, the hover card includes a title of the entity. In certain embodiments, the title includes a formal title of the entity, a label describing the entity's role within a community, or an alias of the entity.

At step 1920, the hover card is presented to the user. In certain embodiments, the hover card is displayed proximate to the pointer.

Although this disclosure describes and illustrates particular steps of the method of FIG. 19 as occurring in a particular order, this disclosure contemplates any suitable steps of the method of FIG. 19 occurring in any suitable order. Moreover, although this disclosure describes and illustrates particular components carrying out particular steps of the method of FIG. 19, this disclosure contemplates any suitable combination of any suitable components carrying out any suitable steps of the method of FIG. 19.

As described above, computer program 150 may include policy manager 230 that may be utilized to implement various policies in order to control how and when users within an organization may access content created and shared by other users within the organization. For example, policy manager 230 within computer program 150 may be utilized to restrict access to content based on the time of day or how a user is connected to computer system 120. An example embodiment of a method utilized by policy manager 230 to control access to content within the organization is described below.

Existing social networking solutions allow a user to create a digital dairy of all of their activities and then share it with their friends and relatives. To control access to content created by its users, typical social networking solutions implement a role-based access control policy. In such systems, access to content is based solely on the identity of the person seeking access.

Figure 20:
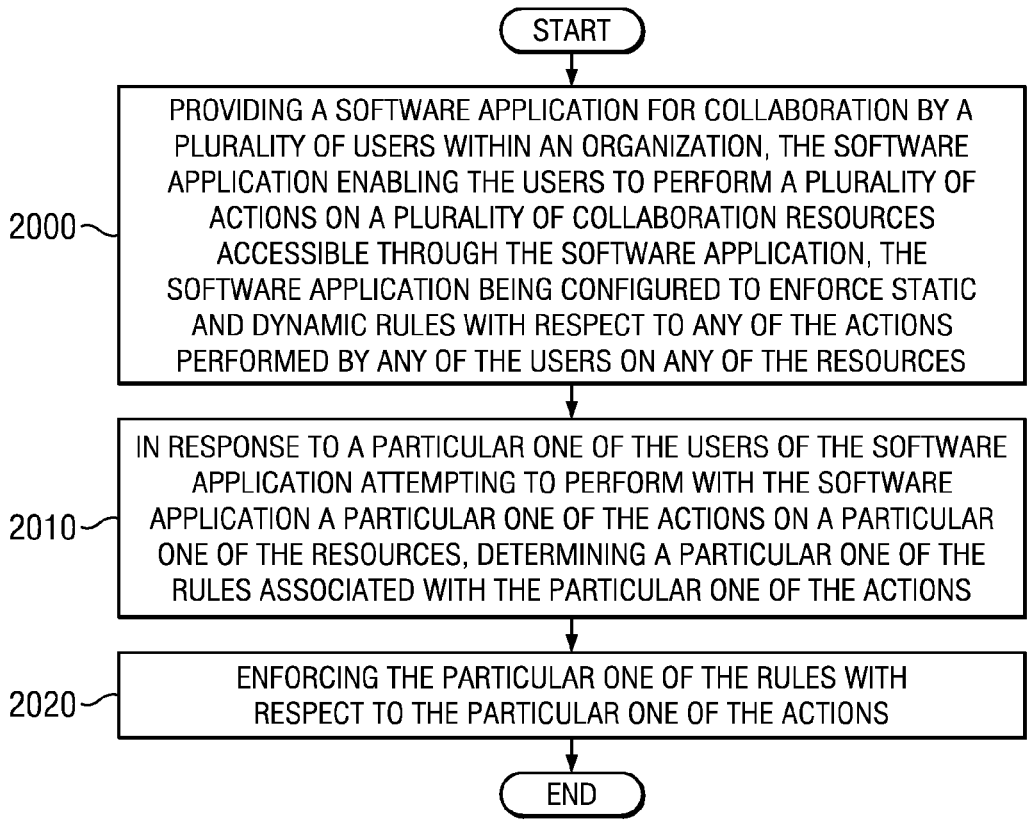
FIG. 20 illustrates an example method implementing one or more policies within the system of FIG. 1.

FIG. 20 illustrates one embodiment of a method 2000 that may be utilized by policy manager 230 to control access to content within an organization. Method 2000 addresses the limitations and drawbacks of existing social networking solutions by implementing a rule-based policy engine to automatically enforce the organization's policies regarding information security, regulatory compliance, document retention, and the like. Furthermore, unlike existing solutions, method 2000 is dynamic, flexible, and context sensitive.

Method 2000 may start at step 2010, where a software application for collaboration by a plurality of users within an organization is provided. In some embodiments, the software application of step 2010 may be computer program 150 described above. In certain embodiments, the software application of step 2010 enables the users within the organization to perform a variety of actions on a variety of collaboration resources accessible through the software application. For example, users within the organization may interact with the software application to create and publish posts 710, as described above with respect to FIGS. 7-10. As another example, users within the organization may interact with the software application to select other users within the organization to follow and then receive updates in watchlist 1130 when the other users perform actions, as described above with respect to FIGS. 11-13. In certain embodiments, the actions of step 2010 include performing a search, creating a new community of users, joining an existing community, viewing a post 710, sharing a post 710, commenting on a post 710, editing a post 710, uploading a file, creating a sub-folder, sending an email, and sending a microblog.

In certain embodiments, the software application of step 2010 is configured to enforce static and dynamic rules with respect to any of the actions performed by any of the users on any of the resources within the organization. Static rules may refer to rules that are defined as part of the user or resource definition and stored in a policy database. As one example, a particular user may create a post 710 using webpage 800 and then create one or more policies 910 using post access options interface 900 to define access permissions for post 710. The one or more policies 910 created using post access options interface 900 are static rules that are stored and then utilized to control access by other users to post 710. As another example, access to content such as posts 710 may be restricted to certain times of the day (e.g., during business hours), or to users who are connected to the system in a certain way (e.g., allow access if connected through an intranet but disallow if connected through a VPN). Dynamic rules may refer to rules that are dynamically computed in code. For example, a decision to allow a user to become a member of a particular community may be a dynamic decision based on the user's relationship to the owner of the community. In another example, a community may be created where anyone in the reporting chain of the creator may automatically be granted membership privileges. In this example, the reporting relationship may be determined from a LDAP directory at run time.

At step 2020, method 2000 includes, in response to a particular one of the users of the software application attempting to perform with the software application a particular one of the actions on a particular one of the resources, determining a particular one of the rules associated with the particular one of the actions. In certain embodiments, the particular one of the rules is based at least in part on the particular one of the resources, one or more particular attributes of the particular one of the actions, and an identity of the particular one of the users. As an example for illustrative purposes only, a particular rule associated with a particular post 710 that was previously created by a first user may be determined in response to a second user attempting to comment on the particular post 710. In this example, one or more policies 910 that were created by the first user using post access options interface 900 to define access permissions for the particular post 710 may be accessed when the second user attempts to comment on the particular post 710. The one or more policies 910 may then be analyzed to determine whether a particular rule exists for the second user regarding the particular post 710. For example, it may be determined that the first user created a policy 910 for the particular post 710 that allows the second user to only view and share the particular post 710.

In certain embodiments, the particular one of the rules of step 2020 is based additionally/alternatively on the relationships of the particular one of the resources to other resources, or relationships of the particular one of the users to other users. In certain embodiments, the particular one of the rules of step 2020 is based on people to people relationships, people to community relationships, community to community relationships, people to information relationships, communities to information relationships, and information to information relationships. For example, a community owner can specify that the members of the current community and members of related communities may have access to a particular one of the resources. In certain embodiments, the particular one of the rules of step 2020 is based additionally/alternatively on social graph 400, as described above.

At step 2030, method 2000 includes enforcing the particular one of the rules with respect to the particular one of the actions. Using the above example, the particular one of the rules that would be enforced would be the determined rule that the second user may only view or share the particular post 710. As are result, the second user would be blocked from commenting on the particular post 710 when the second user attempts to add the comment.

In certain embodiments, the rules enforced in step 2030 may be enforced based on contextual information. For example, rules may be enforced base on the time of day or the title of the user. Additionally, rules may be enforced based on how the user is connected to the system, such as allowing access if the user is connected directly through an intranet and denying access if the user is connected via a VPN. In certain embodiments, the rules enforced in step 2030 may be enforced based on any information that may be extracted from a database such as a LDAP directory, a relational database such as social graph store 330, and the like.

In certain embodiments, method 2000 may additionally include inheriting static and dynamic rules. For example, all resources in a particular community may inherit a default policy from the community policy. In another example, all portlets or gadgets in a particular webpage may inherit a default policy from the page policy. In certain embodiments, organizational collaboration systems from two or more separate departments or organizations may be federated together for inter-departmental or inter-company collaboration. Here, the policy enforcement can be federated across multiple policy engines based on which system the user belongs to and which system owns the resource being accessed.

Although this disclosure describes and illustrates particular steps of the method of FIG. 20 as occurring in a particular order, this disclosure contemplates any suitable steps of the method of FIG. 20 occurring in any suitable order. Moreover, although this disclosure describes and illustrates particular components carrying out particular steps of the method of FIG. 19, this disclosure contemplates any suitable combination of any suitable components carrying out any suitable steps of the method of FIG. 20.

Figure 21:
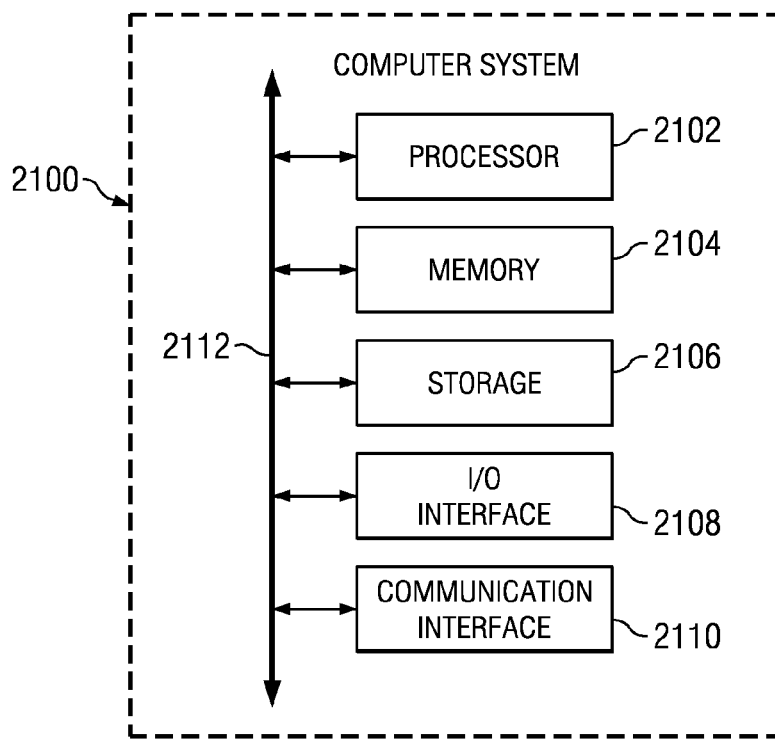
FIG. 21 illustrates an example computer system.

Particular embodiments may be implemented on one or more computer systems. FIG. 21 illustrates an example computer system 2100. In particular embodiments, one or more computer systems 2100 perform one or more steps of one or more methods described or illustrated herein. In particular embodiments, one or more computer systems 2100 provide functionality described or illustrated herein. In particular embodiments, software running on one or more computer systems 2100 performs one or more steps of one or more methods described or illustrated herein or provides functionality described or illustrated herein. Particular embodiments include one or more portions of one or more computer systems 2100.

This disclosure contemplates any suitable number of computer systems 2100. This disclosure contemplates computer system 2100 taking any suitable physical form. As example and not by way of limitation, computer system 2100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 2100 may include one or more computer systems 2100; be unitary or distributed; span multiple locations; span multiple machines; or reside in a cloud, which may include one or more cloud components in one or more networks. Where appropriate, one or more computer systems 2100 may perform without substantial spatial or temporal limitation one or more steps of one or more methods described or illustrated herein. As an example and not by way of limitation, one or more computer systems 2100 may perform in real time or in batch mode one or more steps of one or more methods described or illustrated herein. One or more computer systems 2100 may perform at different times or at different locations one or more steps of one or more methods described or illustrated herein, where appropriate.

In particular embodiments, computer system 2100 includes a processor 2102, memory 2104, storage 2106, an input/output (I/O) interface 2108, a communication interface 2110, and a bus 2112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2102 includes hardware for executing instructions, such as those making up a computer program. As an example and not by way of limitation, to execute instructions, processor 2102 may retrieve (or fetch) the instructions from an internal register, an internal cache, memory 2104, or storage 2106; decode and execute them; and then write one or more results to an internal register, an internal cache, memory 2104, or storage 2106. In particular embodiments, processor 2102 may include one or more internal caches for data, instructions, or addresses. The present disclosure contemplates processor 2102 including any suitable number of any suitable internal caches, where appropriate. As an example and not by way of limitation, processor 2102 may include one or more instruction caches, one or more data caches, and one or more translation lookaside buffers (TLBs). Instructions in the instruction caches may be copies of instructions in memory 2104 or storage 2106, and the instruction caches may speed up retrieval of those instructions by processor 2102. Data in the data caches may be copies of data in memory 2104 or storage 2106 for instructions executing at processor 2102 to operate on; the results of previous instructions executed at processor 2102 for access by subsequent instructions executing at processor 2102 or for writing to memory 2104 or storage 2106; or other suitable data. The data caches may speed up read or write operations by processor 2102. The TLBs may speed up virtual-address translation for processor 2102. In particular embodiments, processor 2102 may include one or more internal registers for data, instructions, or addresses. The present disclosure contemplates processor 2102 including any suitable number of any suitable internal registers, where appropriate. Where appropriate, processor 2102 may include one or more arithmetic logic units (ALUs); be a multi-core processor; or include one or more processors 2102. Although this disclosure describes and illustrates a particular processor, this disclosure contemplates any suitable processor.

In particular embodiments, memory 2104 includes main memory for storing instructions for processor 2102 to execute or data for processor 2102 to operate on. As an example and not by way of limitation, computer system 2100 may load instructions from storage 2106 or another source (such as, for example, another computer system 2100) to memory 2104. Processor 2102 may then load the instructions from memory 2104 to an internal register or internal cache. To execute the instructions, processor 2102 may retrieve the instructions from the internal register or internal cache and decode them. During or after execution of the instructions, processor 2102 may write one or more results (which may be intermediate or final results) to the internal register or internal cache. Processor 2102 may then write one or more of those results to memory 2104. In particular embodiments, processor 2102 executes only instructions in one or more internal registers or internal caches or in memory 2104 (as opposed to storage 2106 or elsewhere) and operates only on data in one or more internal registers or internal caches or in memory 2104 (as opposed to storage 2106 or elsewhere). One or more memory buses (which may each include an address bus and a data bus) may couple processor 2102 to memory 2104. Bus 2112 may include one or more memory buses, as described below. In particular embodiments, one or more memory management units (MMUs) reside between processor 2102 and memory 2104 and facilitate accesses to memory 2104 requested by processor 2102. In particular embodiments, memory 2104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 2104 may include one or more memories 2104, where appropriate. Although this disclosure describes and illustrates particular memory, this disclosure contemplates any suitable memory.

In particular embodiments, storage 2106 includes mass storage for data or instructions. As an example and not by way of limitation, storage 2106 may include an HDD, a floppy disk drive, flash memory, an optical disc, a magneto-optical disc, magnetic tape, or a Universal Serial Bus (USB) drive or a combination of two or more of these. Storage 2106 may include removable or non-removable (or fixed) media, where appropriate. Storage 2106 may be internal or external to computer system 2100, where appropriate. In particular embodiments, storage 2106 is non-volatile, solid-state memory. In particular embodiments, storage 2106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2106 taking any suitable physical form. Storage 2106 may include one or more storage control units facilitating communication between processor 2102 and storage 2106, where appropriate. Where appropriate, storage 2106 may include one or more storages 2106. Although this disclosure describes and illustrates particular storage, this disclosure contemplates any suitable storage.

In particular embodiments, I/O interface 2108 includes hardware, software, or both providing one or more interfaces for communication between computer system 2100 and one or more I/O devices. Computer system 2100 may include one or more of these I/O devices, where appropriate. One or more of these I/O devices may enable communication between a person and computer system 2100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2108 for them. Where appropriate, I/O interface 2108 may include one or more device or software drivers enabling processor 2102 to drive one or more of these I/O devices. I/O interface 2108 may include one or more I/O interfaces 2108, where appropriate. Although this disclosure describes and illustrates a particular I/O interface, this disclosure contemplates any suitable I/O interface.

In particular embodiments, communication interface 2110 includes hardware, software, or both providing one or more interfaces for communication (such as, for example, packet-based communication) between computer system 2100 and one or more other computer systems 2100 or one or more networks. As an example and not by way of limitation, communication interface 2110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2110 for it. As an example and not by way of limitation, computer system 2100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2100 may include any suitable communication interface 2110 for any of these networks, where appropriate. Communication interface 2110 may include one or more communication interfaces 2110, where appropriate. Although this disclosure describes and illustrates a particular communication interface, this disclosure contemplates any suitable communication interface.

In particular embodiments, bus 2112 includes hardware, software, or both coupling components of computer system 2100 to each other. As an example and not by way of limitation, bus 2112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 2112 may include one or more buses 2112, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 2102 (such as, for example, one or more internal registers or caches), one or more portions of memory 2104, one or more portions of storage 2106, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

Figure 22:
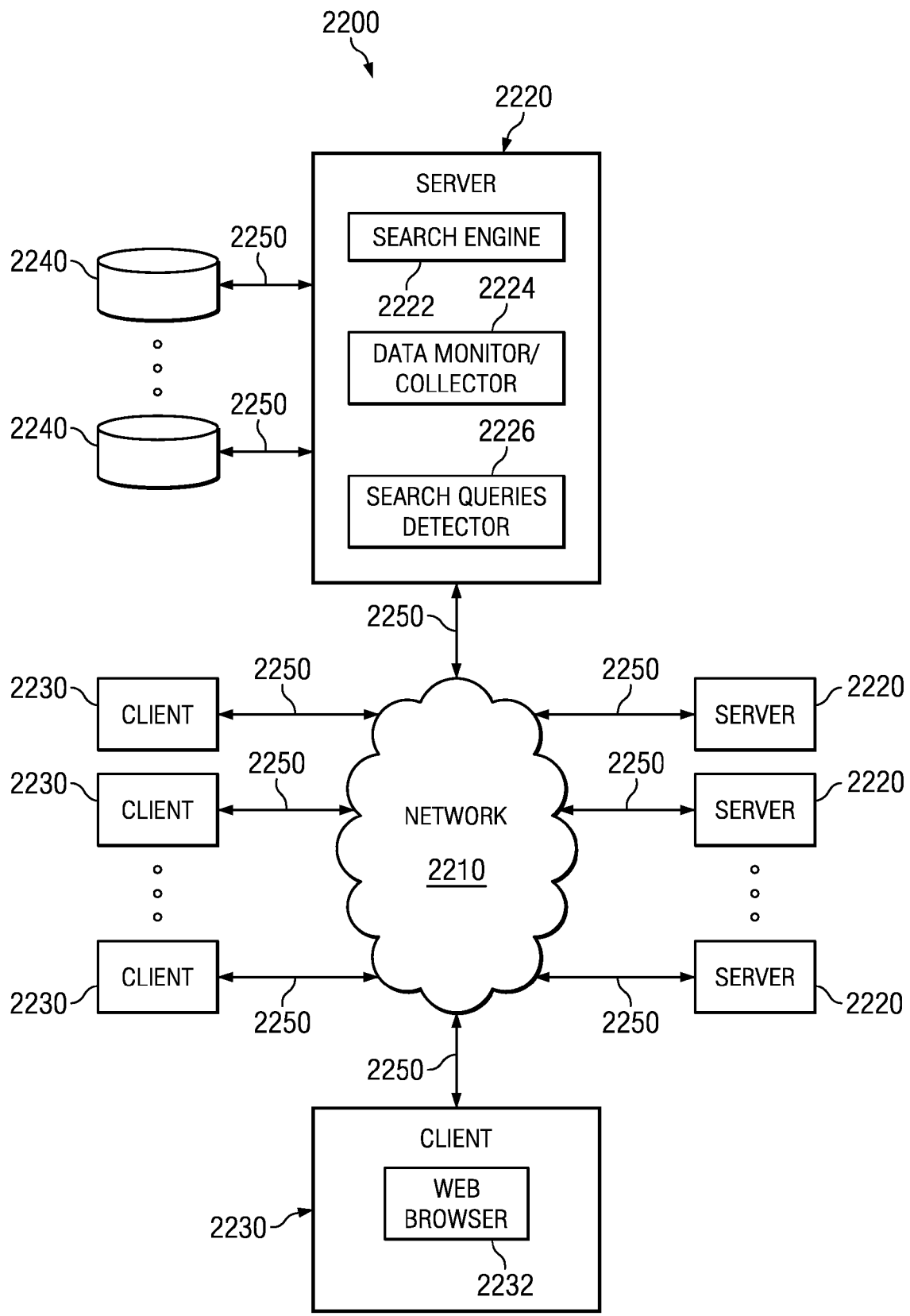
FIG. 22 illustrates an example network environment.

Particular embodiments may be implemented in a network environment. FIG. 22 illustrates an example network environment 2200. Network environment 2200 includes a network 2210 coupling one or more servers 2220 and one or more clients 2230 to each other. In particular embodiments, network 2210 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 2210 or a combination of two or more such networks 2210. The present disclosure contemplates any suitable network 2210.

One or more links 2250 couple servers 2220 or clients 2230 to network 2210. In particular embodiments, one or more links 2250 each includes one or more wired, wireless, or optical links 2250. In particular embodiments, one or more links 2250 each includes an intranet, an extranet, a VPN, a LAN, a WLAN, a WAN, a MAN, a communications network, a satellite network, a portion of the Internet, or another link 2250 or a combination of two or more such links 2250. The present disclosure contemplates any suitable links 2250 coupling servers 2220 and clients 2230 to network 2210.

In particular embodiments, each server 2220 may be a unitary server or may be a distributed server spanning multiple computers or multiple datacenters. Servers 2220 may be of various types, such as, for example and without limitation, web server, news server, mail server, message server, advertising server, file server, application server, exchange server, database server, or proxy server. In particular embodiments, each server 2220 may include hardware, software, or embedded logic components or a combination of two or more such components for carrying out the appropriate functionalities implemented or supported by server 2220. For example, a web server is generally capable of hosting websites containing web pages or particular elements of web pages. More specifically, a web server may host HTML files or other file types, or may dynamically create or constitute files upon a request, and communicate them to clients 2230 in response to HTTP or other requests from clients 2230. A mail server is generally capable of providing electronic mail services to various clients 2230. A database server is generally capable of providing an interface for managing data stored in one or more data stores.

In particular embodiments, each client 2230 may be an electronic device including hardware, software, or embedded logic components or a combination of two or more such components and capable of carrying out the appropriate functionalities implemented or supported by client 2230. For example and without limitation, a client 2230 may be a desktop computer system, a notebook computer system, a netbook computer system, a handheld electronic device, or a mobile telephone. A client 2230 may enable a network user at client 2230 to access network 2210. A client 2230 may have a web browser, such as Microsoft Internet Explorer or Mozilla Firefox, and may have one or more add-ons, plug-ins, or other extensions, such as Google Toolbar or Yahoo Toolbar. A client 2230 may enable its user to communicate with other users at other clients 2230. The present disclosure contemplates any suitable clients 2230.

In particular embodiments, one or more data storages 2240 may be communicatively linked to one or more servers 2220 via one or more links 2250. In particular embodiments, data storages 2240 may be used to store various types of information. In particular embodiments, the information stored in data storages 2240 may be organized according to specific data structures. Particular embodiments may provide interfaces that enable servers 2220 or clients 2230 to manage (e.g., retrieve, modify, add, or delete) the information stored in data storage 2240.

In particular embodiments, a server 2220 may include a search engine 2222. Search engine 2222 may include hardware, software, or embedded logic components or a combination of two or more such components for carrying out the appropriate functionalities implemented or supported by search engine 2222. For example and without limitation, search engine 2222 may implement one or more search algorithms that may be used to identify network resources in response to the search queries received at search engine 2222, one or more ranking algorithms that may be used to rank the identified network resources, one or more summarization algorithms that may be used to summarize the identified network resources, and so on. The ranking algorithms implemented by search engine 2222 may be trained using the set of the training data constructed from pairs of search query and clicked URL.

In particular embodiments, a server 2220 may also include a data monitor/collector 2224. Data monitor/collection 2224 may include hardware, software, or embedded logic components or a combination of two or more such components for carrying out the appropriate functionalities implemented or supported by data collector/collector 2224. For example and without limitation, data monitor/collector 2224 may monitor and collect network traffic data at server 2220 and store the collected network traffic data in one or more data storage 2240. The pairs of search query and clicked URL may then be extracted from the network traffic data.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
   receiving information from a user in a collaboration network, the information comprising:
   a unit of content;
   a title for the unit of content;
   an indication of one or more entities in the collaboration network allowed to access the unit of content; and
   for each of the entities in the collaboration network allowed to access the unit of content, an indication of a selection of access rights for the respective entity of one or more of view, comment, edit, or share;
   based at least in part on the indication of the selection of one or more of view, comment, edit, or share for at least one of the one or more entities in the collaboration network allowed to access the unit of content, selecting a format for presentation of the unit of content to be one of a wiki format, a blog format, a discussion forum format, or an email format;
   publishing the unit of content and the title for the unit of content to the collaboration network in the selected format and according to the information; and
   wherein the one or more entities comprise one or more other users or one or more communities of other users; and
   wherein the format is selected to be:
   the wiki format based on the indication of the selection of each and every one of view, comment, edit, and share, and not based on an indication of a selection of the wiki format, for the at least one of the one or more entities in the collaboration network allowed to access the unit of content;
   the blog format based on the indication of the selection of each and every one of view, comment, and share, and an indication of not selecting edit, and not based on an indication of a selection of the blog format, for the at least one of the one or more entities in the collaboration network allowed to access the unit of content; or
   the discussion forum format based on the indication of the selection of each and every one of view and comment, and an indication of not selecting each of edit and share, and not based on an indication of a selection of the discussion forum format, for the at least one of the one or more entities in the collaboration network allowed to access the unit of content.

2. The method of claim 1, further comprising generating and storing a single entity in a database for the received information, the single entity in the database comprising the unit of content, the title for the unit of content, the indication of one or more entities in the collaboration network allowed to access the unit of content, and the indication of the permission level.

3. The method of claim 2, wherein the publishing the unit of content and the title for the unit of content to the collaboration network comprises displaying the unit of content and the title for the unit of content to a plurality of entities in more than one determined format using only the single stored entity.

4. One or more computer-readable non-transitory storage media embodying software that is operable when executed by one or more computer systems to:
   receive information from a user in a collaboration network, the information comprising:
   a unit of content;
   a title for the unit of content;
   an indication of one or more entities in the collaboration network allowed to access the unit of content; and
   for each of the entities in the collaboration network allowed to access the unit of content, an indication of a selection of access rights for the respective entity of one or more of view, comment, edit, or share;
   based at least in part on the indication of the selection of one or more of view, comment, edit, or share for at least one of the one or more entities in the collaboration network allowed to access the unit of content, select a format for presentation of the unit of content to be one of a wiki format, a blog format, a discussion forum format, or an email format;
   publish the unit of content and the title for the unit of content to the collaboration network in the selected format and according to the information; and
   wherein the one or more entities comprise one or more other users or one or more communities of other users; and
   wherein the format is selected to be:
   the wiki format based on the indication of the selection of each and every one of view, comment, edit, and share, and not based on an indication of a selection of the wiki format, for the at least one of the one or more entities in the collaboration network allowed to access the unit of content;
   the blog format based on the indication of the selection of each and every one of view, comment, and share, and an indication of not selecting edit, and not based on an indication of a selection of the blog format, for the at least one of the one or more entities in the collaboration network allowed to access the unit of content; or
   the discussion forum format based on the indication of the selection of each and every one of view and comment, and an indication of not selecting each of edit and share, and not based on an indication of a selection of the discussion forum format, for the at least one of the one or more entities in the collaboration network allowed to access the unit of content.

5. The media of claim 4, the software further operable to generate and store a single entity in a database for the received information, the single entity in the database comprising the unit of content, the title for the unit of content, the indication of one or more entities in the collaboration network allowed to access the unit of content, and the indication of the permission level.

6. The media of claim 5, wherein the publishing the unit of content and the title for the unit of content to the collaboration network comprises displaying the unit of content and the title for the unit of content to a plurality of entities in more than one determined format using only the single stored entity.

7. The media of claim 4, wherein the share permission level indicates whether to allow, for each of the entities in the collaboration network allowed to access the unit of content, the ability to share the unit of content with other entities in the collaboration network.

8. An apparatus comprising:
   one or more communication interfaces;
   one or more memory devices containing one or more instructions for execution by one or more processing devices; and
   the processing devices, operable when executing the instructions to:
   receive information from a user in a collaboration network, the information comprising:
   a unit of content;
   a title for the unit of content;
   an indication of one or more entities in the collaboration network allowed to access the unit of content; and
   for each of the entities in the collaboration network allowed to access the unit of content, an indication of a selection of access rights for the respective entity of one or more of view, comment, edit, or share;
   based at least in part on the indication of the selection of one or more of view, comment, edit, or share for at least one of the one or more entities in the collaboration network allowed to access the unit of content, select a format for presentation of the unit of content to be one of a wiki format, a blog format, a discussion forum format, or an email format;
   publish the unit of content and the title for the unit of content to the collaboration network in the selected format and according to the information; and
   wherein the one or more entities comprise one or more other users or one or more communities of other users; and
   wherein the format is selected to be:
   the wiki format based on the indication of the selection of each and every one of view, comment, edit, and share, and not based on an indication of a selection of the wiki format, for the at least one of the one or more entities in the collaboration network allowed to access the unit of content;
   the blog format based on the indication of the selection of each and every one of view, comment, and share, and an indication of not selecting edit, and not based on an indication of a selection of the blog format, for the at least one of the one or more entities in the collaboration network allowed to access the unit of content; or
   the discussion forum format based on the indication of the selection of each and every one of view and comment, and an indication of not selecting each of edit and share, and not based on an indication of a selection of the discussion forum format, for the at least one of the one or more entities in the collaboration network allowed to access the unit of content.

9. The apparatus of claim 8, wherein the publishing the unit of content and the title for the unit of content to the collaboration network comprises displaying the unit of content and the title for the unit of content to a plurality of entities in more than one determined format using only a single entity stored in a database.

10. The method of claim 1, wherein:

the indication of the selection of one or more of view, comment, edit, or share for the at least one of the one or more entities comprises an indication of a selection of only view for the at least one of the one or more entities; and publishing the unit of content and the title for the unit of content to the collaboration network in the selected format and according to the information comprises:

sending the unit of content and the title for the unit of content to the at least one of the one or more entities in the e-mail format; and preventing the at least one of the one or more entities from forwarding the e-mail to other entities.

11. The method of claim 1, wherein publishing the unit of content and the title for the unit of content to the collaboration network in the selected format and according to the information comprises:

for a first entity, publishing the unit of content and the title for the unit of content in a first format; and for a second entity, publishing the unit of content and the title for the unit of content in a second format, wherein the first format is different than the second format.

12. The one or more computer-readable non-transitory storage media embodying software of claim 4 further operable to:

for a first entity, publish the unit of content and the title for the unit of content in a first format; and for a second entity, publish the unit of content and the title for the unit of content in a second format, wherein the first format is different than the second format.

13. The apparatus of claim 8, wherein the processing devices are further operable to:

for a first entity, publish the unit of content and the title for the unit of content in a first format; and for a second entity, publish the unit of content and the title for the unit of content in a second format, wherein the first format is different than the second format.

\* \* \* \* \*